US011198745B2

(12) United States Patent
Lopez-Barron et al.

(10) Patent No.: US 11,198,745 B2
(45) Date of Patent: Dec. 14, 2021

(54) POLY(ALPHA-OLEFIN)S AND METHODS THEREOF

(71) Applicant: ExxonMobil Chemical Patents Inc., Baytown, TX (US)

(72) Inventors: Carlos R. Lopez-Barron, Houston, TX (US); Andy H. Tsou, Houston, TX (US); John R. Hagadorn, Houston, TX (US); Sarah J. Mattler, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/692,646

(22) Filed: Nov. 22, 2019

(65) Prior Publication Data
US 2020/0190236 A1 Jun. 18, 2020

Related U.S. Application Data

(60) Provisional application No. 62/772,916, filed on Nov. 29, 2018.

(51) Int. Cl.
| *C08F 210/14* | (2006.01) |
| *C08F 10/14* | (2006.01) |
| *C08F 4/76* | (2006.01) |
| *C08F 110/14* | (2006.01) |
| *C07F 7/00* | (2006.01) |

(52) U.S. Cl.
CPC ............. *C08F 110/14* (2013.01); *C07F 7/00* (2013.01); *C08F 210/14* (2013.01); *C08F 4/76* (2013.01)

(58) Field of Classification Search
CPC ...... C08F 10/14; C08F 110/14; C08F 210/14; C08F 210/16; C08F 4/76
See application file for complete search history.

(56) References Cited

U.S. PATENT DOCUMENTS

| | | | | |
|---|---|---|---|---|
| 2,887,471 A * | 5/1959 | Shearer, Jr. | ............... | C08F 4/69 526/105 |
| 3,151,181 A * | 9/1964 | Hewitt | ................. | C08F 210/00 585/18 |
| 3,255,137 A * | 6/1966 | Hay | ........................ | C08L 91/06 524/247 |
| 3,367,909 A * | 2/1968 | Hay | ....................... | C09J 123/24 524/343 |
| 3,391,219 A * | 7/1968 | Davis | ...................... | C07C 11/02 585/328 |
| 3,450,786 A * | 6/1969 | Young | ...................... | C08F 4/12 585/426 |
| 4,032,591 A * | 6/1977 | Cupples | .................... | C07C 9/22 585/643 |
| 4,594,469 A * | 6/1986 | Loveless | ................... | C07C 2/30 526/206 |
| 4,613,712 A * | 9/1986 | Bridger | ................. | C08F 110/14 526/129 |
| 4,642,410 A * | 2/1987 | Loveless | ................... | C07C 2/30 585/522 |
| 4,822,945 A * | 4/1989 | Bronstert | ............. | C10M 107/10 585/517 |
| 5,167,876 A | 12/1992 | Lem et al. | ..................... | 252/602 |
| 5,171,908 A * | 12/1992 | Rudnick | .............. | C10G 69/126 585/10 |
| 5,187,023 A | 2/1993 | Prevorsek et al. | ............ | 428/911 |
| 5,187,250 A * | 2/1993 | Asanuma | ................ | C08F 10/08 526/160 |
| 5,188,724 A * | 2/1993 | Heilman | .............. | C10M 143/08 208/18 |
| 5,196,252 A | 3/1993 | Harpell | ........................ | 428/102 |
| 5,296,433 A * | 3/1994 | Siedle | ...................... | C08F 10/00 502/117 |
| 5,315,053 A * | 5/1994 | Beach | ....................... | C07C 9/22 208/18 |
| 5,316,820 A | 5/1994 | Harpell et al. | ................. | 428/109 |
| 5,362,527 A | 11/1994 | Harpell et al. | ................. | 428/33 |
| 5,480,706 A | 1/1996 | Li et al. | ........................ | 428/113 |
| 5,677,029 A | 10/1997 | Prevorsek et al. | ............ | 428/113 |
| 5,756,580 A | 5/1998 | Natori et al. | ................. | 525/100 |
| 6,313,077 B1 * | 11/2001 | Stunnenberg | ........ | C10M 111/04 508/591 |
| 6,646,174 B2 * | 11/2003 | Clarembeau | .............. | C07C 2/20 585/521 |
| 6,706,828 B2 * | 3/2004 | DiMaio | ................ | C10M 145/02 526/160 |
| 6,730,627 B1 | 5/2004 | Masi et al. | ..................... | 502/133 |
| 6,858,767 B1 * | 2/2005 | DiMaio | .................. | C08F 10/00 585/511 |
| 6,869,917 B2 * | 3/2005 | Deckman | ............. | C10M 111/04 508/110 |
| 7,547,811 B2 * | 6/2009 | Kramer | .................. | C10G 50/02 585/510 |

(Continued)

FOREIGN PATENT DOCUMENTS

| CN | 110078753 A * | 8/2019 | ................ C07F 5/02 |
|---|---|---|---|
| EP | 2111909 | 10/2009 | ............ B01D 69/12 |

(Continued)

OTHER PUBLICATIONS

López-Barrón, C.R.; Tsou, A.H.; Hagadorn, J.R.; Throckmorton, J.A. Macromolecules 2018, 51, 6958-6966.*

(Continued)

*Primary Examiner* — Rip A Lee

(57) ABSTRACT

The present disclosure relates to poly(alpha-olefin)s and methods for making poly(alpha-olefin)s. A poly(alpha-olefin) may include about 95 wt % or greater $C_{10}$-$C_{18}$ alpha-olefin content and have a weight average molecular weight of from about 1,000,000 g/mol to about 10,000,000 g/mol. A method for forming a poly(alpha-olefin) may include introducing one or more $C_{10}$-$C_{18}$ alpha-olefins to a catalyst system comprising a catalyst compound and an activator. The method may include obtaining poly(alpha-olefin)s comprising about 95 wt % or greater $C_{10}$-$C_{18}$ alpha-olefin content and having a weight average molecular weight of from about 1,000,000 g/mol to about 10,000,000 g/mol.

26 Claims, 5 Drawing Sheets

(56) References Cited

U.S. PATENT DOCUMENTS

| | | | |
|---|---|---|---|
| 7,550,640 B2* | 6/2009 | Surana | C10M 107/10 585/532 |
| 7,592,497 B2* | 9/2009 | Yang | C10M 107/10 585/525 |
| 7,880,047 B2* | 2/2011 | Knowles | C08F 10/14 585/523 |
| 7,943,807 B2* | 5/2011 | Burton | C10M 143/08 585/18 |
| 7,973,116 B2 | 7/2011 | Hagadorn et al. | 526/172 |
| 8,207,390 B2* | 6/2012 | Wu | C08F 10/14 585/523 |
| 8,491,674 B2* | 7/2013 | Kawamoto | C10L 10/14 44/300 |
| 8,530,712 B2* | 9/2013 | Wu | C10M 111/04 585/18 |
| 8,748,361 B2* | 6/2014 | Wu | C08F 210/04 508/591 |
| 8,889,931 B2* | 11/2014 | Luo | C10M 107/10 585/18 |
| 9,023,960 B2* | 5/2015 | Katayama | C10M 143/08 526/160 |
| 9,169,334 B2 | 10/2015 | Stewart et al. | C08F 8/02 |
| 9,248,430 B2* | 2/2016 | Huang | B01J 37/0205 |
| 9,365,663 B2* | 6/2016 | Hagemeister | C08F 10/14 |
| 9,458,254 B2* | 10/2016 | Canich | C08F 110/06 |
| 9,469,704 B2* | 10/2016 | Hagemeister | C08F 10/14 |
| 9,688,792 B2* | 6/2017 | Welle | C08F 4/65908 |
| 9,718,897 B1* | 8/2017 | Burton | C08F 4/65908 |
| 9,718,898 B1* | 8/2017 | Burton | C08F 110/14 |
| 10,351,488 B2* | 7/2019 | Islam | C07C 2/32 |
| 10,626,200 B2 | 4/2020 | Hagadorn et al. | C08F 210/02 |
| 10,954,462 B2* | 3/2021 | Tsou | C10M 119/02 |
| 2002/0019503 A1 | 2/2002 | Kol et al. | 526/134 |
| 2002/0065352 A1 | 5/2002 | Johnston et al. | 524/487 |
| 2002/0173604 A1 | 11/2002 | Kol et al. | 526/134 |
| 2002/0193650 A1* | 12/2002 | Goze | C10M 107/10 585/521 |
| 2007/0036982 A1 | 2/2007 | Perez et al. | 428/416 |
| 2007/0225534 A1* | 9/2007 | Goze | C10G 50/02 585/525 |
| 2009/0081543 A1 | 3/2009 | Takita et al. | 429/188 |
| 2009/0124760 A1 | 5/2009 | Kaneko et al. | 525/205 |
| 2009/0136774 A1 | 5/2009 | Onogi et al. | 428/516 |
| 2010/0063213 A1 | 3/2010 | Fredrickson et al. | 525/240 |
| 2010/0069687 A1* | 3/2010 | Kosover | C08F 10/14 585/1 |
| 2010/0159230 A1 | 6/2010 | Luo et al. | 428/304 |
| 2011/0017611 A1 | 1/2011 | Menozzi et al. | 205/763 |
| 2011/0105639 A1 | 5/2011 | Menozzi et al. | 523/100 |
| 2012/0175555 A1 | 7/2012 | Menozzi et al. | 252/188 |
| 2012/0187345 A1 | 7/2012 | Menozzi et al. | 252/400 |
| 2012/0302481 A1* | 11/2012 | Katayama | C08F 10/14 508/591 |
| 2014/0235909 A1* | 8/2014 | Shimizu | C10M 3/00 585/12 |
| 2014/0256997 A1* | 9/2014 | Shimizu | C10M 107/10 585/12 |
| 2014/0309375 A1 | 10/2014 | Naisby et al. | 525/333 |
| 2015/0316356 A1 | 11/2015 | Saucedo | F41H 1/02 |
| 2016/0013431 A1 | 1/2016 | Choi et al. | H01L 51/0087 |
| 2017/0225428 A1 | 8/2017 | Muir | B32B 5/18 |
| 2018/0002352 A1 | 1/2018 | Hagadorn et al. | C07F 7/00 |
| 2018/0094099 A1 | 4/2018 | Johnson et al. | C08G 61/02 |
| 2018/0142179 A1* | 5/2018 | Han | C08F 4/61922 |
| 2019/0248936 A1* | 8/2019 | Yang | C07F 17/00 |

FOREIGN PATENT DOCUMENTS

| | | | |
|---|---|---|---|
| RU | 2368624 | 9/2009 | C08F 10/14 |
| RU | 2015/112040 | 10/2016 | C08F 10/10 |
| WO | 1989/006190 | 7/1989 | B32B 5/12 |
| WO | 1990/015897 | 12/1990 | D06M 15/59 |
| WO | 1991/008895 | 6/1991 | |
| WO | WO 02/088205 A2* | 11/2002 | C08F 210/14 |
| WO | WO2007-035492 | 3/2007 | C08F 297/08 |
| WO | 2010/136173 | 12/2010 | C08F 2/44 |

OTHER PUBLICATIONS

Ahmadjo, S. (2016) "Preparation of ultra-high molecular weight amorphous poly(l-hexene) by a Ziegler-Natta catalyst," *Polymers for Advanced Technologies*, v.27(11), pp. 1523-1529.

Atiqullah, M. et al. (2017) "UHMW Ziegler-Natta polyethylene: Synthesis, crystallization, and melt behavior," *Journal of the Taiwan Institute of Chemical Engineers*, v.76, pp. 141-155.

Fujita, M. et al. (2004) "Synthesis of ultra-high-molecular-weight poly(alpha-olefin)s by thiobis(phenoxy)titanium/modified methylaluminoxane system," *Journal of Polymer Science, Part A: Polymer Chemistry*, v.42(5), pp. 1107-1111.

López-Barrón, C. et al. (2018) "Microstructure of Crystallizable α-Olefin Molecular Bottlebrushes: Isotactic and Atactic Poly(1-octadecene)," *Macromolecules*, v.51(3), pp. 872-883.

Makio, H. et al. (2002) "FI Catalysts: A New Family of High Performance Catalysts for Olefin Polymerization," *Advanced Synthesis & Catalysis*, v.344(5), pp. 477-493.

Nifant'ev et al. (2018) "The synthesis of ultra-high molecular weight poly(1-hexene)s by low-temperature Ziegler-Natta precipitation polymerization in fluorous reaction media," *Polymer*, v.139, pp. 98-106.

Nakayama, Y. et al. (2003) "Development of FI Catalyst Systems and their Applications to New Polyolefin-Based Materials," *Journal of Synthetic Org. Chem. Japan*, v.61(11), pp. 1124-1137.

Saito, J. et al. (2003) "Higher Alpha-Olefin Polymerization Behavior of a bis(phenoxy-imine)titanium Complex/i-Bu3Al/Ph3CB(C6F5)4 Catalyst System," *Chemistry Letters*, v.32(3), pp. 236-237.

\* cited by examiner

POLY(ALPHA-OLEFIN)S AND METHODS THEREOF

CROSS-REFERENCE TO RELATED APPLICATIONS

This application claims priority to and the benefit of U.S. Ser. No. 62/772,916, filed Nov. 29, 2018.

FIELD

The present disclosure relates to poly(alpha-olefin)s and methods for making poly(alpha-olefin)s.

BACKGROUND

There is currently global rising demand for high quality thermoplastic polymers, particularly Ultra-high molecular weight (UHMW) thermoplastic elastomers (TPEs), in both household and industrial applications. For example, there is demand for the development of new polymers with tailored properties, such as high melt strength, strong shear and high extensional strain hardening. The molecular weight (Mw) of polymers is one parameter that can determine the mechanical properties of polymers. High molecular weight increases 1) how far the material can stretch before rupturing (higher degree of entanglement allows the material to be pulled further before the chains break; 2) the impact resistance of the material (higher degree of entanglement means that in order to rupture, more polymer bonds need to be broken, this means that the polymer can absorb more energy before failing); 3) the chemical resistance; 4) the viscosity of the material (the longer the chains, the harder it is to get them to flow because they are more tangled).

However, production and manufacture of such UHMW-TPEs with desirable-tailored properties have been a challenge. Indeed, TPEs usually require a microstructure of interconnected soft and hard domains to produce the elastomeric response needed. The hard domains of such polymers are typically made of a glassy polymer (as in styrenic block copolymers) or crystalline domains (as in olefin block copolymers).

Hence, the unique architecture and physical properties of the polymers' topology have become increasingly relevant in polymer applications. For example, such polymers are of interest as rheology modifiers, supersoft elastomers, anti-fouling coatings, in vivo delivery of therapeutic agents, photonic crystals, and lubricants.

The side-chains of "bottlebrush" polymers have significant conformational flexibility, and by tailoring their structure and length they can exhibit reversible chemical properties. Bottlebrush polymers differ from their linear analogs in their size, shape persistence, cylindrical nanostructure, and their inability to interact through chain entanglement properties that are highly dependent on the molecular weight of the pendant side chains as well as the backbone degree of polymerization (DP). Despite recent progress, bottlebrush polymers with high melt strength, strong shear, controllable Mw, high side-chain and backbone degree of polymerization, narrow molecular weight distributions (MWD), and uniform grafting densities remain challenging synthetic targets.

There is a need for new and improved thermoplastic elastomers that are poly(alpha-olefin)s (PAOs) with an ultra-high molecular weight (e.g., molecular weight of about 1,000,000 g/mol or greater) and having high melt strength and strong shear. There is further a need for polymerization methods that provide PAOs with UHMW, high melt strength, and strong shear.

References for citing in an Information Disclosure Statement (37 CFR 1.97(h)): US Pub. No. 2018/0002352; C. R. López-Barron, et al. (2018) "Microstructure of Crystallizable a—Olefin Molecular Bottlebrushes: Isotactic and Atactic Poly(1-octadecene)," *Macromolecules*, v. 51(3), pp. 872-883; U.S. Pat. No. 9,169,334; US Pub. No. 2018/0094099; Nifant'ev et al. (2018) "The synthesis of ultra-high molecular weight poly(1-hexene)s by low-temperature Ziegler-Natta precipitation polymerization in fluorous reaction media," *Polymer*, v. 139, pp. 98-106; WO 1991/008895; US Pub. No. 2010/063213; WO 2007/114134; WO 1989/006190; RU 2015112040; EP 2111909; RU 2368624; US Pub. No. 2009/081543; US Pub. No. 2010/0159230; Atiqullah, M. et al. (2017) "UHMW Ziegler-Natta polyethylene: Synthesis, crystallization, and melt behavior," *Journal of the Taiwan Institute of Chemical Engineers*, v. 76, pp. 141-155; Ahmadjo, S. (2016) "Preparation of ultra-high molecular weight amorphous poly(1-hexene) by a Ziegler-Natta catalyst," *Polymers for Advanced Technologies*, v. 27(11), pp. 1523-1529; Masayuki Fujita et al. (2004) "Synthesis of ultra-high-molecular-weight poly(alpha-olefin)s by thiobis (phenoxy)titanium/modified methylaluminoxane system," *Journal of Polymer Science, Part A: Polymer Chemistry*, v. 42(5), pp. 1107-1111; Nakayama, Y. et al. (2003) "Development of FI Catalyst Systems and their Applications to New Polyolefin-Based Materials," *Journal of Synth. Org. Chem. Japan*, v. 61(11), pp. 1124-1137; Junji, S. et al. (2003) "Higher Alpha-Olefin Polymerization Behavior of a bis (phenoxy-imine)titanium Complex/i-$Bu_3Al/Ph_3CB(C_6F_5)_4$ Catalyst System," *Chemistry Letters*, v. 32(3), pp. 236-237; Makio, Haruyuki et al. (2002) "FI Catalysts: A New Family of High Performance Catalysts for Olefin Polymerization" *Advanced Synthesis & Catalysis*, v. 344(5), pp. 477-493; WO 1990/015897; US Pub. No. 2017/225428; U.S. Pat. No. 5,480,706; US Pub. No. 2015/316356; US Pub. No. 2009/124760; US Pub. No. 2002/019503; US Pub. No. 2013/084827; US Pub. No. 2011/017611; U.S. Pat. Nos. 5,756,580; 5,167,876; US Pub. No. 2011/105639; U.S. Pat. Nos. 5,187,023; 5,316,820; WO 2010/136173; US Pub. No. 2002/065352; US Pub. No. 2007/036982; U.S. Pat. No. 5,677,029; US Pub. No. 2017/333890; U.S. Pat. No. 5,196,252; US Pub. No. 2012/187345; US Pub. No. 2012/175555; U.S. Pub. No. 2014/309375; U.S. Pat. Nos. 6,730,627; 5,362,527; US Pub. No. 2002/173604.

SUMMARY

The present disclosure relates to poly(alpha-olefin)s and methods for making poly(alpha-olefin)s.

Poly(alpha-olefin)s can be prepared via organometallic polymerization of $C_{10}$-$C_{18}$ alpha-olefins, and exhibit thermoplastic elastomeric properties having high melt strength, strong shear thinning and large stretchability.

In at least one embodiment, a method for producing poly(alpha-olefin)s, such as UHMW poly(alpha-olefin)s includes contacting one or more alpha-olefins with a catalyst system comprising a catalyst compound and an activator at a temperature of from about 20° C. to about 30° C., such as about 25° C.; and obtaining a poly(alpha-olefin) having a number average molecular weight (Mn) value of about 300,000 or greater. In an alternate embodiment, a method for producing poly(alpha-olefin)s, such as UHMW poly(alpha-olefin)s includes: i) contacting one or more alpha-olefins with a catalyst system comprising a catalyst compound and an activator at a temperature of from about 50° C. to about 70° C.; and obtaining a poly(alpha-olefin) having an Mn value of about 300,000 or greater.

Poly(alpha-olefin)s of the present disclosure can be poly(alpha-olefin)s synthesized from a catalyst system comprising a non-metallocene group 4 transition metal complex and a non-coordinating anion activator. Processes of the present disclosure can provide poly(alpha-olefin)s having one or more of: an Mw/Mn from about 1 to about 3 (narrow PDI); an Mw from about 1,000,000 to about 10,000,000 g/mol; a glass transition temperature $T_g$ of from about −100° C. to about −10° C.; a melting temperature $T_m$ of from about 0° C. to about 100° C., a plateau modulus $G_N^0$ of from about 1 kPa to about 300 kPa; an entanglement mass (also referred to as "entanglement molecular weight") $M_e$ of from about 1 kg/mol to about 200 kg/mol; a number of entanglements per chain Z of from about 10 to about 10,000; a complex viscosity (measured at 60° C.) of from about 10 Pa·s to about 10,000,000 Pa·s; an extensional viscosity (also referred to as elongation viscosity) (measured at 60° C.) of from about 10 Pa·s to about 10,000,000 Pa·s; a tensile strength (measured at room temperature) of from about 2 MPa at the maximum stress (maximum strain of 100%) and 2.5 MPa at the maximum stress (maximum strain of 300%) on the complete stress-strain plot.

DETAILED DESCRIPTION

Figure 1:
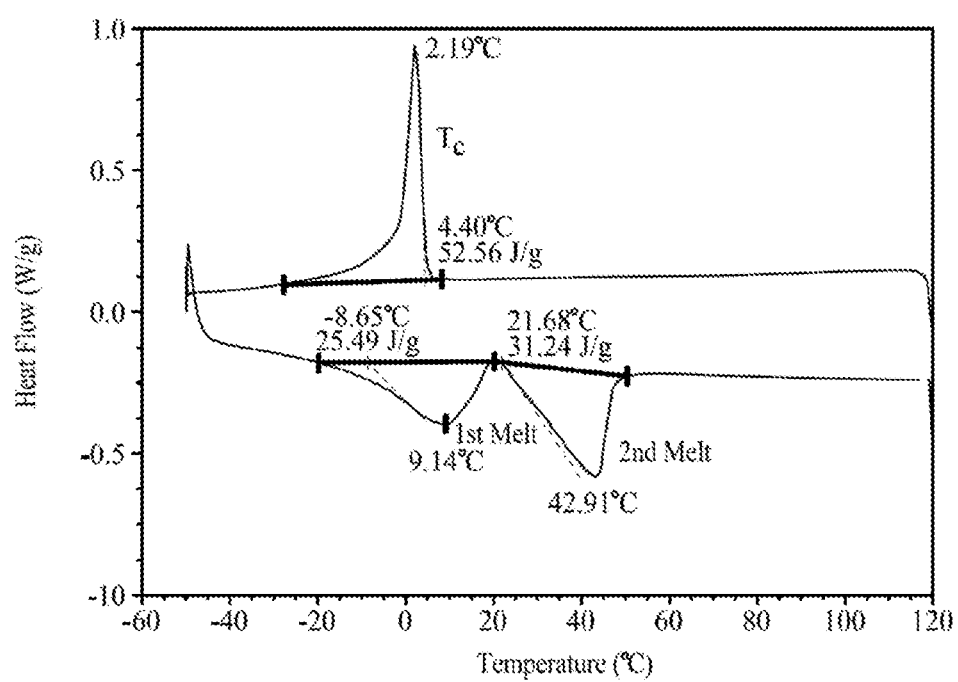
FIG. 1 is a graph illustrating a Differential Scanning calorimetry plot of poly(1-tetradecene) illustrating the heat flow as function of the temperature, according to one embodiment.

The present disclosure relates to poly(alpha-olefin)s, such as ultra-high molecular weight (UHMW) poly(alpha-olefin)s, and methods for making poly(alpha-olefin)s. Poly(alpha-olefin)s of the present disclosure can have elongation properties such that the polymers have flowability and processability which provide extrudability for blown film applications.

A poly(alpha-olefin) may include about 95 wt % or greater $C_{10}$-$C_{18}$ alpha-olefin content and have a weight average molecular weight of from about 1,000,000 g/mol to about 10,000,000 g/mol. A method for forming a poly(alpha-olefin) may include introducing one or more $C_{10}$-$C_{18}$ alpha-olefins to a scavenger and a catalyst system comprising a catalyst compound and an activator. The method may include obtaining a poly(alpha-olefin) having about 95 wt % or greater $C_{10}$-$C_{18}$ alpha-olefin content and having a weight average molecular weight of from about 1,000,000 g/mol to about 10,000,000 g/mol.

A poly(alpha-olefin) may include about 95 wt % or greater $C_{10}$-$C_{18}$ alpha-olefin content and about 5 wt % or less of $C_2$-$C_8$ alpha olefin content. A poly(alpha-olefin) may include about 98 wt % or greater $C_{10}$-$C_{18}$ alpha-olefin content and about 2 wt % or less of $C_2$-$C_8$ alpha olefin content. A poly(alpha-olefin) may include about 95 wt % or greater $C_{10}$-$C_{18}$ alpha-olefin content and about 5 wt % or less of ethylene content.

Poly(alpha-olefin)s can be prepared via organometallic polymerization of $C_{10}$-$C_{18}$ alpha-olefins, with a non-metallocene catalyst and an activator, the polymer having good melt properties and thermoplastic elastomeric properties due to side-chain crystallization. Such properties include high melt strength, strong shear thinning and large stretchability.

In at least one embodiment, a method for producing poly(alpha-olefin)s, such as UHMW poly(alpha-olefin)s includes contacting one or more alpha-olefins with a catalyst system comprising a catalyst compound and an activator at about 25° C.; and obtaining a poly(alpha-olefin) having an Mn value of about 300,000 or greater. In an alternate embodiment, a method for producing poly(alpha-olefin)s, such as UHMW poly(alpha-olefin)s includes: i) contacting one or more alpha-olefins with a catalyst system comprising a catalyst compound and an activator at a temperature of from about 50° C. to about 70° C.; and obtaining a poly(alpha-olefin) having an Mn value of about 300,000 or greater.

Poly(alpha-olefin)s can be synthesized from a catalyst system comprising a non-metallocene group 4 transition metal complex and a non-coordinating anion activator. Processes of the present disclosure can provide poly(alpha-olefin)s having one or more of: an Mw/Mn from about 1 to about 3 (narrow PDI); an Mw from about 1,000,000 to about 10,000,000 g/mol; a glass transition temperature $T_g$ of from about −100° C. to about −10° C.; a melting temperature $T_m$ of from 0° C. to about 100° C., a plateau modulus $G_N^0$ of from about 1 kPa to about 300 kPa; an entanglement mass (also referred to as "entanglement molecular weight") Me of from about 1 kg/mol to about 200 kg/mol; a number of entanglement per chain Z of from about 10 to about 10,000; a complex viscosity (measured at 60° C.) of from about 10 Pa·s to about 10,000,000 Pa·s; an extensional viscosity (also referred to as elongation viscosity) (measured at 60° C.) of from about 10 Pa·s to about 10,000,000 Pa·s (strong strain-hardening is observed when a poly(alpha-olefin) is stretched at rates >0.32 s$^{-1}$); a tensile strength (measured at room temperature) of from about 2 MPa at the maximum stress (maximum strain of 100%) and 2.5 MPa at the maximum stress (maximum strain of 300%) on the complete stress-strain plot.

For purposes herein, the numbering scheme for the Periodic Table Groups is used as described in *Chemical and Engineering News*, v. 63(5), pg. 27 (1985). For example, a "Group 4 metal" is an element from Group 4 of the Periodic Table, e.g., Hf, Ti, or Zr.

As used herein, an "olefin," alternatively referred to as "alkene," is a linear, branched, or cyclic compound of carbon and hydrogen having at least one double bond. For purposes of this specification, when a polymer or copolymer is referred to as comprising an olefin, including, but not limited to, ethylene, propylene, and butene, the olefin present in such polymer or copolymer is the polymerized form of the olefin. For example, when a copolymer is said to have an "ethylene" content of 35 wt % to 55 wt %, it is understood that the monomer ("mer") unit in the copolymer is derived from ethylene in the polymerization reaction and said derived units are present at 35 wt % to 55 wt %, based upon the weight of the copolymer.

A "polymer" has two or more of the same or different monomer ("mer") units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers.

The terms "bottlebrush polymer" or "polymer brush" refer to a polymer including a polymeric backbone of repeating units, wherein the repeating units of the polymeric backbone are covalently linked to polymeric sidechains. In at least one embodiment, each repeating unit of the polymeric backbone is linked to a polymeric sidechain.

For purposes of this disclosure, ethylene shall be considered an α-olefin (also referred to as an "alpha-olefin").

An "alpha-olefin" is an olefin having a double bond at the alpha (or 1-) position. A "linear alpha-olefin" or "LAO" is an olefin with a double bond at the alpha position and a linear hydrocarbon chain. A "poly(alpha-olefin)" or "PAO" is a polymer having two or more alpha-olefin units. As used herein, terms "poly(alpha-olefin)" and "poly(alpha-olefin) polymer" are used interchangeably. For the purposes of this disclosure, the term "α-olefin" includes $C_2$-$C_{20}$ olefins. Non-limiting examples of α-olefins include ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

As used herein, the term "substituted" means that a hydrogen group has been replaced with a heteroatom, or a heteroatom-containing group. For example, a "substituted hydrocarbyl" is a radical made of carbon and hydrogen where at least one hydrogen is replaced by a heteroatom or heteroatom-containing group.

As used herein, Mn is number average molecular weight, Mw is weight average molecular weight, and Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weight units (e.g., Mw, Mn, Mz) are g/mol.

Unless otherwise noted all melting points ($T_m$) are DSC second melt.

As used herein, a "catalyst" includes a single catalyst, or multiple catalysts. Catalysts can have isomeric forms such as conformational isomers or configurational isomers. Conformational isomers include, for example, conformers and rotamers. Configurational isomers include, for example, stereoisomers.

The term "complex," may also be referred to as catalyst precursor, precatalyst, catalyst, catalyst compound, transition metal compound, or transition metal complex. These words are used interchangeably. Activator and cocatalyst are also used interchangeably.

Unless otherwise indicated, the term "substituted" generally means that a hydrogen of the substituted species has been replaced with a different atom or group of atoms. For example, methyl-cyclopentadiene is cyclopentadiene that has been substituted with a methyl group. Likewise, picric acid can be described as phenol that has been substituted with three nitro groups, or, alternatively, as benzene that has been substituted with one hydroxy and three nitro groups.

The following abbreviations may be used herein: Me is methyl, Ph is phenyl, Et is ethyl, Pr is propyl, iPr is isopropyl, n-Pr is normal propyl, Bu is butyl, i-Bu is isobutyl, tBu is tertiary butyl, n-Bu is normal butyl, MAO is methylalumoxane, Bn is benzyl (i.e., $CH_2Ph$), RT is room temperature (and is 23° C. unless otherwise indicated), Cy is cyclohexyl, cP is centipoise, VI is viscosity index, VM is viscosity modifier, W/g is watts per gram, Pa·s is pascal-second, J/g is Joules per gram.

An "anionic ligand" is a negatively charged ligand that donates one or more pairs of electrons to a metal ion. A "neutral donor ligand" is a neutrally charged ligand which donates one or more pairs of electrons to a metal ion.

As used herein, a "catalyst system" includes at least one catalyst compound and an activator. A catalyst system of the present disclosure can further include a support material and an optional co-activator. For the purposes of this disclosure, when a catalyst is described as including neutral stable forms of the components, it is well understood by one of ordinary skill in the art, that the ionic form of the component is the form that reacts with the monomers to produce polymers. Furthermore, catalysts of the present disclosure represented by a Formula are intended to embrace ionic forms thereof of the compounds in addition to the neutral stable forms of the compounds. Furthermore, activators of the present disclosure are intended to embrace ionic/reaction product forms thereof of the activator in addition to ionic or neutral form.

A "scavenger" is a compound that can be added to a reactor to facilitate polymerization by scavenging impurities. Some scavengers may also act as activators and may be referred to as co-activators. A co-activator, that is not a scavenger, may also be used in conjunction with an activator in order to form an active catalyst. In at least one embodiment, a co-activator is pre-mixed with the transition metal compound to form an alkylated transition metal compound. Examples of scavengers include trialkylaluminums, methylalumoxanes, modified methylalumoxanes, MMAO-3A (Akzo Nobel), bis(diisobutylaluminum)oxide (Akzo Nobel), tri(n-octyl)aluminum, triisobutylaluminum, and diisobutylaluminum hydride, and free-radical scavengers such as antioxidants (e.g., octadecyl 3-(3,5-di-tert-butyl-4-hydroxyphenyl)propionate also referred to as Irganox® 1076, available from Ciba-Geigy).

As used herein, "alkoxides" include those where the alkyl group is a $C_1$ to $C_{10}$ hydrocarbyl. The alkyl group may be straight chain, branched, or cyclic. The alkyl group may be saturated or unsaturated. In at least one embodiment, the alkyl group may include at least one aromatic group.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" refers to $C_1$-$C_{100}$ radicals, that may be linear, branched, or cyclic, and when cyclic, aromatic or non-aromatic. Examples of such radicals include methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and their substituted analogues. Substituted hydrocarbyl radicals are radicals in which at least one hydrogen atom of the hydrocarbyl radical has been substituted with at least one halogen (such as Br, Cl, F or I) or at least one functional group such as $C(O)R^*$, $C(O)NR^*_2$, $C(O)OR^*$, $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, and $PbR^*_3$ (where $R^*$ is independently a hydrogen or hydrocarbyl radical, and two or more $R^*$ may join together to form a substituted or unsubstituted saturated, partially unsaturated or aromatic cyclic or polycyclic ring structure), or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals include ethenyl, propenyl, allyl, 1,4-butadienyl cyclopropenyl, cyclobutenyl, cyclopentenyl, cyclohexenyl, cyclooctenyl, including their substituted analogues.

The term "alkoxy" or "alkoxide" means an alkyl ether or aryl ether radical wherein the term alkyl is as defined above. Examples of suitable alkyl ether radicals include methoxy, ethoxy, n-propoxy, iso-propoxy, n-butoxy, iso-butoxy, sec-butoxy, tert-butoxy, and phenoxyl.

The term "aryl" or "aryl group" includes a $C_4$-$C_{20}$ aromatic ring, such as a six carbon aromatic ring, and the substituted variants thereof, including phenyl, 2-methyl-phenyl, xylyl, 4-bromo-xylyl. Likewise heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

A "ring carbon atom" is a carbon atom that is part of a cyclic ring structure. By this definition, a benzyl group has six ring carbon atoms and para-methylstyrene also has six ring carbon atoms.

Where isomers of a named alkyl, alkenyl, alkoxide, or aryl group exist (e.g., n-butyl, iso-butyl, iso-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

For any particular compound disclosed herein, any general or specific structure presented also encompasses all conformational isomers, regio-isomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom-substituted ring where a hydrogen on a ring atom is replaced with a heteroatom. For example, tetrahydrofuran is a heterocyclic ring and 4-N,N-dimethylamino-phenyl is a heteroatom-substituted ring.

As used herein the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

A "composition" of the present disclosure can include components (e.g., oil, polymer, etc.) and/or reaction product(s) of two or more of the components.

The term "continuous" means a system that operates without interruption or cessation. For example a continuous process to produce a polymer would be one where the reactants are continually introduced into one or more reactors and polymer product is continually withdrawn during a polymerization process.

A solution polymerization means a polymerization process in which the polymer is dissolved in a liquid polymerization medium, such as an inert solvent or monomer(s) or their blends. A solution polymerization can be homogeneous. A homogeneous polymerization is one where the polymer product is dissolved in the polymerization medium. Such systems are not turbid as described in J. Vladimir Oliveira, C. Dariva and J. C. Pinto, Ind. Eng. Chem. Res., 2000, Vol. 29, p. 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as about 0 wt %.

"Conversion" is the amount of monomer that is converted to polymer product, and is reported as mol % and is calculated based on the polymer yield and the amount of monomer fed into the reactor.

Herein, "catalyst" and "catalyst complex" are used interchangeably.

The present disclosure relates to poly(alpha-olefins), such as poly(alpha-olefins) having an Mw value of 1,000,000 or greater, that may be used in any suitable thermoplastic or elastomer application. Examples may include uses in molded parts, films, tapes, sheets, tubing, hose, sheeting, wire and cable coating, antifouling coatings, stimuli responsive coatings, adhesives, shoe soles, bumpers, gaskets, bellows, films, fibers, elastic fibers, nonwovens, spun bonds, rheology modifiers, supersoft elastomers, photonic crystals, nanoporous materials, corrosion protection coatings and sealants.

The present disclosure relates to methods of polymerizing $C_{10}$-$C_{18}$ alpha-olefins to produce a poly(alpha-olefin), the method including introducing a non-metallocene catalyst compound to one or more $C_{10}$ to $C_{18}$ alpha-olefins. The catalyst compounds may be a pyridyldiamido (PDA) or quinolinyldiamido (QDA) transition metal complex.

Polymer Products

The present disclosure relates to compositions of matter produced by the methods described herein.

In at least one embodiment, a process described herein produces $C_{10}$ to $C_{18}$ poly(alpha-olefin)s having an Mw value of 1,000,000 g/mol or greater. Poly(olefin)s can include, but are not limited to, poly(1-hexene), such as poly(1-octene), such as poly(1-nonene), such as poly(1-decene), such as poly(1-dodecene), such as poly(1-tetradecene), such as poly (1-octadecene). In at least one embodiment, a poly(alpha-olefin) produced is a poly(1-hexene), a poly(1-octene), a poly(1-nonene), a poly(1-decene), a poly(1-dodecene), a poly(1-tetradecene), or a poly(1-octadecene).

While the molecular weight of the polymers produced herein can be influenced by reactor conditions including temperature, monomer concentration and pressure, and the like, the poly(alpha-olefin)s produced by a process of the present disclosure may have an Mw of about 1,000,000 to about 10,000,000 g/mol, such as from about 1,200,000 to about 9,000,000 g/mol, such as from about 1,400,000 to about 8,000,000 g/mol, such as from about 1,600,000 to about 6,500,000 g/mol, as determined by GPC (as described below). A poly(alpha-olefin) of the present disclosure can have an Mn value of about 300,000 g/mol or greater, such as from about 300,000 g/mol to about 1,000,000 g/mol, such as from about 400,000 g/mol to about 800,000 g/mol, such as from about 450,000 g/mol to about 600,000 g/mol. In at least one embodiment, the poly(alpha-olefin)s produced herein have an Mw/Mn value of from about 1 to about 3, such as from about 1.2 to about 2.8, such as from about 1.4 to about 2.6.

In at least one embodiment, the poly(alpha-olefin)s produced herein are UHMW polymers. Such UHMW poly (alpha-olefin)s can be "bottlebrush"-like polymers having an entanglement mass (also referred to as "entanglement molecular weight") $M_e$ (as described below) of from about 1 kg/mol to about 200 kg/mol, such as from about 5 kg/mol to about 150 kg/mol, such as from about 10 kg/mol to about 125 kg/mol; a number of entanglements per chain Z of from about 10 to about 10,000, such as from about 15 to about 5,000, such as from about 20 to about 1,000, such as from about 50 to about 500. Z is a number of entanglements per chain of polymers and is dependent on the concentration (number of chains per unit volume) and the length of the chains (molecular weight). Z is computed from the measured Mw and $M_e$ values as $Z=Mw/M_e$.

For purposes of the claims, melting temperature ($T_m$) and heat of fusion (Hf) are measured by differential scanning calorimetry (DSC) using a DSC2500 unit (TA Instruments). The sample is first equilibrated at 25° C. and subsequently heated to 100° C. using a heating rate of 10° C./min (first heat). The sample is held at 100° C. for 5 min. The sample is subsequently cooled down to –100° C. with a constant cooling rate of 10° C./min (first cool). The sample is equilibrated at –100° C. before being heated to 100° C. at a constant heating rate of 10° C./min (second heat). The endothermic peak of melting (second heat) is also analyzed using the TA TRIOS software and the peak melting temperature ($T_m$) corresponding to 10° C./min heating rate is determined. In at least one embodiment, the poly(alpha-olefin) polymers have a heat of fusion ("$H_f$"), as determined by the Differential Scanning calorimetry (DSC), of from about 1 J/g to about 75 J/g, such as about 5 J/g to about 70 J/g, such as about 10 to about 60 J/g, such as about 20 J/g to about 40 J/g.

In at least one embodiment, the poly(alpha-olefin)s produced herein have a Tm value of from 0° C. to about 100° C., such as from about –5° C. to about 80° C., such as from about –1° C. to about 60° C. In at least one embodiment, the poly(alpha-olefin)s produced herein have a glass transition temperature $T_g$ value of from about –100° C. to about –10° C., such as from about –80° C. to about –20° C., such as from about –70° C. to about –30° C., such as from about –70° C. to about –65° C. (measurements of $T_g$ as described below).

Plateau modulus $G_N^0$ reflects the molecular architecture of the polymers and has contributions from both crosslinks (cross-link density v can be estimated from the plateau modulus $G_N^0$, as described below) and entanglements. In non-crosslinked polymers, $G_N^0$ is proportional to the number of entanglements per unit volume and inversely proportional to the average molecular weight of the molecular segment between entanglements. Poly(alpha-olefin)s of the present disclosure may have a plateau modulus $G_N^0$ value of from about 1 kPa to about 300 kPa, such as from about 5 kPa to about 200 kPa, such as from about 10 kPa to about 150 kPa.

The poly(alpha-olefin) polymers of the present disclosure can have a heat of flow, as determined by Differential Scanning calorimetry (DSC), of from about –1 W/g to about 2 W/g, such as –0.8 W/g to about 1.5 W/g, such as –0.6 W/g to about 1 W/g.

In at least one embodiment, the poly(alpha-olefin) polymers have a complex viscosity (measured at 60° C.) (measurements as described below) of from about 10 Pa·s to about 10,000,000 Pa·s, such as from about 20 Pa·s to about 8,000,000 Pa·s, such as from about 30 Pa·s to about 5,000,000 Pa·s. The poly(alpha-olefin) polymers may have an extensional viscosity (also referred to as elongation viscosity) (measured at 60° C.) of from about 10 Pa·s to about 10,000,000 Pa·s, such as from about 100 Pa·s to about 7,500,000 Pa·s, such as from about 1,000 Pa·s to about 5,000,000 Pa·s (strong strain-hardening is observed when the poly(alpha-olefin) polymers stretched at rates>0.32 s$^{-1}$).

The poly(alpha-olefin) polymers of the present disclosure may have a stress-strain behavior of a soft elastomer (measurements performed using the Mullin test, as described below) with a maximum stress value of from about 5 MPa to about 9 MPa, such as about 7 MPa, at a 500% strain. In at least one embodiment, the permanent set and hysteresis of the poly(alpha-olefin) polymers increase upon subsequent stretching cycles with increasing maximum strains.

The elastic limit on a stress-strain curve is the point where the behavior of the material switches from elastic to plastic. If the stress (and therefore strain) applied to a material is lower than the elastic limit, both the stress and strain will return to zero (recover) when the load is removed. If, however, the elastic limit is exceeded, only the elastic strain will be recovered, and the plastic strain will remain as permanent set. The stress in the material will unload along a path parallel to the elastic modulus. The permanent set values of poly(alpha-olefin)s as a function of strain can be of from about 1% to about 400% at a strain value of from 0% to about 500%, such as a permanent set of about 125% at a 200% strain.

In at least one embodiment, the poly(alpha-olefin) polymers have a tensile strength (measured at room temperature) (measurements as described below) of from about 1 MPa to about 3 MPa, such as about 2 MPa, at the maximum stress (maximum strain of 100%) and about 2 MPa to about 3.5 MPa, such as about 2.5 MPa, at the maximum stress (maximum strain of 300%) on a complete stress-strain plot.

Poly(alpha-olefin) polymers of the present disclosure are UHMW poly(alpha-olefin) polymers and may have a comonomer content of from about 0.01 mol % to about 5 mol %, such as from about 0.1 mol % to about 4 mol %, such as from about 0.5 mol % to about 3 mol %, based upon weight of the poly(alpha-olefin) polymer. Non-limiting examples of suitable comonomers can be at least one of ethylene or a $C_3$ to $C_{20}$ alpha-olefins, such as $C_2$ to $C_{10}$ alpha-olefins, such as $C_2$ to $C_5$ alpha-olefins. For example, a comonomer may be selected from ethylene, propylene, butene, pentene, hexene, heptene, octene, nonene, decene, undecene, dodecene, tetradecene, hexadecane, octadecene, eicosene and isomers thereof.

Poly(alpha-olefin) polymers can be poly(alpha-olefin) copolymers having one or more comonomers. Comonomers can be $C_2$ to $C_{20}$ comonomers, such as ethylene or propylene. For example, a copolymer can be an ethylene(alpha-olefin) copolymer or a propylene(alpha-olefin) copolymer (using, for example, $C_{10}$ to $C_{18}$ alpha olefin monomer(s)) and having a low comonomer incorporation (such as $C_8$ wt %) of less than about 5 wt %, and/or broad molecular weight distribution (MWD). Ethylene(alpha-olefin) copolymers can be selected from an ethylene(1-decene) copolymer, an ethylene(1-dodecene) copolymer, or an ethylene(1-tetradecene) copolymer. Propylene(alpha-olefin) copolymers can be a propylene(1-decene) copolymer, a propylene(1-undecene) copolymer, or a propylene(1-dodecene) copolymer.

In at least one embodiment, the copolymer is an ethylene(alpha-olefin) copolymer having an Mw value of about 1,000,000 g/mol or greater. For example, the copolymer is an ethylene(alpha-olefin) copolymer with an Mw value from about 1,000,000 g/mol to about 10,000,000 g/mol, such as from about 1,250,000 g/mol to about 8,000,000 g/mol, such as from about 1,500,000 g/mol to about 6,000,000 g/mol. In at least one embodiment, the copolymer is an ethylene(alpha-olefin) copolymer with an Mw/Mn value of about 5 or less, such as from about 1 to about 4, such as from about 1 to about 3, such as from about 1 to about 2.5.

An(alpha-olefin) copolymer may have a comonomer content of from about 0.1 wt % to about 5 wt %, such as from about 0.1 wt % to about 4 wt %, such as from about 0.1 wt % to about 3 wt %.

In at least one embodiment, a poly(alpha-olefin) polymer produced is a tactic polymer, such as an isotactic or highly isotactic polymer. The poly(alpha-olefin) polymer produced may be isotactic poly(1-hexene), isotactic poly(1-octene), isotactic poly(1-nonene), isotactic poly(1-decene), isotactic poly(1-dodecene), isotactic poly(1-tetradecene), or isotactic poly(1-octadecene), such as highly isotactic poly(1-hexene), highly isotactic poly(1-octene), highly isotactic poly(1-nonene), highly isotactic poly(1-decene), highly isotactic poly(1-dodecene), highly isotactic poly(1-tetradecene), or highly isotactic poly(1-octadecene).

The term "isotactic poly(alpha-olefin)" (iPAO) is defined as having at least 10% or more isotactic pentads. The term "highly isotactic poly(alpha-olefin)" is defined as having 50% or more isotactic pentads. The term "syndiotactic poly(alpha-olefin)" is defined as having 10% or more syndiotactic pentads. The term "random copolymer poly(alpha-olefin)" (RCPAO), also called poly(alpha-olefin) random copolymer, is defined to be a copolymer of a poly(alpha-olefin) having a comonomer content of greater than 0 wt % to about 5 wt % where the comonomer is chosen from $C_2$ to $C_{20}$ alpha-olefins. In at least one embodiment, isotactic polymers (such as iPAO) have at least 20% (such as at least 30%, such as at least 40%) isotactic pentads. A poly(alpha-olefin) is "atactic," also referred to as "amorphous" if it has less than 10% isotactic pentads and syndiotactic pentads.

Poly(alpha-olefin) microstructure is determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous alpha-olefin groups, "m" referring to meso and "r" to racemic. Samples are dissolved in $d_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in *Polymer Conformation and Configuration* (Academic Press, New York 1969) and J. Randall in *Polymer Sequence Determination*, $^{13}$C-NMR METHOD (Academic Press, New York, 1977).

Overall, processes of the present disclosure can provide poly(alpha-olefin)s with UHMW and high stiffness, which contribute to flow properties (e.g., extensional flow hardening), thus promoting processability (e.g., blow film, blow molding, etc.).

Polymerization Processes

Poly(alpha-olefin)s with UHMW (at least 1,000,000 g/mol or greater) can be prepared via organometallic polymerization of $C_{10}$-$C_{18}$ alpha-olefins with a non-metallocene catalyst and an activator. Poly(alpha-olefin)s thus formed may have thermoplastic elastomeric properties (such as high melt strength, strong shear thinning and large stretchability). Advantageously, the organometallic polymerization process can provide precise spacing between the chains along the backbone of the polymer.

In at least one embodiment, a process for the production of such poly(alpha-olefin) polymers includes: polymerizing an alpha-olefin (e.g., 1-alkene) including one or more $C_{10}$-$C_{18}$ alpha-olefin by contacting the one or more $C_{10}$-$C_{18}$ alpha-olefin with a catalyst system in at least one solution polymerization reactor at a reactor pressure of from about 0.001 MPa to about 28 MPa and a reactor temperature of from about 25° C. to about 180° C. (e.g., from about 25° C. to about 150° C., from about 40° C. to about 140° C., from about 60° C. to about 125° C., from about 70° C. to about 120° C., from about 40° C. to about 70° C., from about 25° C. to about 50° C.), to form an UHMW poly(alpha-olefin) polymer featuring thermoplastic elastomeric properties.

For example, the process for the production of an ethylene(alpha-olefin) copolymer may include: polymerizing ethylene and at least one $C_{10}$-$C_{18}$ alpha-olefin by contacting the ethylene and the at least one $C_{10}$-$C_{18}$ alpha-olefin with a catalyst system in at least one solution polymerization reactor at a reactor pressure of from about 0.05 MPa to about 28 MPa and a reactor temperature of from about 25° C. to about 200° C. to form an ethylene(alpha-olefin) copolymer.

The present disclosure also relates to contacting one or more $C_{10}$ to $C_{18}$ alpha-olefins (e.g., tetradecene), the activator, optionally one or more $C_2$ to $C_{20}$ olefin comonomers, and the non-metallocene catalyst compound under polymerization conditions. The catalyst compound and activator may be combined in any order, and are combined prior to contacting with the monomer.

Monomers include substituted or unsubstituted $C_{10}$ to $C_{18}$ alpha-olefins, such as 1-decene, 1-undecene 1-dodecene, 1-tridecene, 1-tetradecene, 1-pentadecene, 1-hexadecene, 1-heptadecene, 1-octadecene, and isomers thereof. For example, the monomer includes 1-tetradecene and an optional comonomer including one or more ethylene or $C_3$ to $C_{40}$ olefins, such as $C_3$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and or one or more functional groups. In at least one embodiment, the monomer includes 1-octadecene and an optional comonomer comprising one or more $C_2$ to $C_{40}$ olefins, such as $C_2$ to $C_{20}$ olefins, such as $C_2$ to $C_9$ olefins. The $C_2$ to $C_{40}$ olefin monomers may be linear, branched, or cyclic. The $C_2$ to $C_{40}$ cyclic olefins may be strained or unstrained, monocyclic or polycyclic, and may optionally include heteroatoms and/or one or more functional groups.

Exemplary $C_2$ to $C_{40}$ olefin comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 5-methylcyclopentene, cyclopentene, dicyclopentadiene, norbornene, norbornadiene, and their respective homologs and derivatives, such as norbornene, norbornadiene, and dicyclopentadiene. In at least one embodiment, an olefin copolymer is ethylene, propylene, or a mixture thereof.

A copolymer of the present disclosure may be a random copolymer having a comonomer content of greater than 0 wt % to about 5 wt % where the comonomer is chosen from $C_2$ to $C_{20}$ alpha-olefins. Random copolymers, as opposed to block copolymers, of the present disclosure can be formed by injecting monomer and comonomer simultaneously into a reactor to provide copolymers capable of entanglement and a way to adjust the melt temperature of polymers formed by some methods of the present disclosure.

Polymerization processes of the present disclosure can be carried out in any suitable manner. The polymerization reaction can be carried out in the presence of mechanical stirring of the reaction mixture such that a substantially homogeneous reaction mixture with a steady composition is withdrawn from the reactor once the reactor reaches steady state. A polymerization reaction of a process of this disclosure can be carried out under mild pressure. Because the polymerization reaction is sensitive to water and oxygen, the reactor is typically protected by an inert gas atmosphere such as nitrogen. To prevent air leakage into the reactor, the total pressure inside the reactor can be slightly higher than the ambient pressure.

The polymerization reaction can be carried out in the presence of a quantity of inert diluent/solvent. Suitable diluents/solvents for polymerization may include non-coordinating, inert liquids. Examples may include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$-$C_{10}$ alkanes, chlorobenzene, and aromatic and alkylsubstituted aromatic compounds, such as benzene, toluene, mesitylene, and xylene. Suitable solvents may also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents. In at least one embodiment, a solvent/diluent is selected from benzene, toluene, any xylene, ethylbenzene, n-pentane, n-hexane, cyclohexane, n-heptane, n-octane, n-nonane, n-decane, and branched isomers thereof; Isopar® solvent; or a mixture thereof.

In at least one embodiment, the feed concentration of the monomers (and optional comonomers) for the polymerization is 60 vol % solvent or less, such as 40 vol % or less, such as 20 vol % or less, based on the total volume of the feedstream. In at least one embodiment, the polymerization is run in a bulk process.

Polymerizations can be run at any temperature and or pressure suitable to obtain the desired polymers. Suitable temperatures and or pressures may include a temperature in the range of from 0° C. to about 250° C., such as about 20° C. to about 170° C., such as about 35° C. to about 150° C., such as from about 40° C. to about 120° C., such as from about 45° C. to about 80° C.; alternatively at ambient temperature, and at a pressure in the range of from about 0.0.001 MPa to about 28 MPa, such as from about 0.1 MPa to about 7 MPa, such as from about 0.1 MPa to about 4 MPa, such as from about 0.2 MPa to about 3 MPa, such as from about 0.1 MPa to about 1.5 MPa, such as from about 0.65 MPa to about 1 MPa (such as from about 0.95 psig to about 145 psig), alternatively at ambient pressure.

In a batch polymerization, the run time of the reaction is up to 300 hours, such as from about 5 minutes to about 72 hours, such as from about 10 minutes to about 48 hours, such as from about 20 minutes to about 24 hours, such as from about 30 minutes to 12 hours, such as from about 5 minutes to 60 minutes.

In a continuous polymerization, the average residence time of the reaction is up to 24 hours, such as from about 5 minutes to about 120 minutes, such as from about 10 minutes to about 100 minutes, such as from about 30 minutes to about 90 minutes, such as from about 40 minutes to 60 minutes, such as from about 50 minutes to 90 minutes.

In at least one embodiment, hydrogen is present in the polymerization reactor at a partial pressure of from about 0.001 psig to about 50 psig (about 0.000007 MPa to about 0.345 MPa), such as from about 0.01 psig to about 25 psig (about 0.00007 MPa to about 0.172 MPa), such as about 0.1 psig to about 10 psig (about 0.0007 MPa to about 0.069 MPa).

In at least one embodiment, the conversion of olefin monomer is at least 5%, based upon polymer yield and the weight of the monomer entering the reaction zone, such as 10% or more, such as 20% or more, such as 30% or more, such as 50% or more, such as 80% or more.

In at least one embodiment, little or no alumoxane is used in the process to produce the polymers. For example, alumoxane is present at zero mol %, alternately the alumoxane is present at a molar ratio of aluminum to transition metal less than 500:1, such as less than 300:1, such as less than 100:1, such as less than 1:1.

In at least one embodiment, little or no scavenger is used in the process to produce the polymer. For example, scavenger (e.g., tri alkyl aluminum) is present at zero mol %, alternately the scavenger is present at a molar ratio of scavenger metal to transition metal of less than 100:1, such as less than 50:1, such as less than 15:1, such as less than 10:1.

In at least one embodiment, the polymerization: 1) is conducted at temperatures of 0° C. to 250° C. (such as 25°

C. to 150° C., such as 40° C. to 120° C., such as 45° C. to 80° C., such as ambient temperature); 2) is conducted at a pressure of atmospheric pressure to 28 MPa (such as 0.02 to 10 MPa, such as from 0.02 to 6 MPa, such as from 0.02 to 3 MPa, such as from 0.03 to 2.5 MPa, such as ambient pressure); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics are present in the solvent at less than 1 wt %, such as less than 0.5 wt %, such as at 0 wt % based upon the weight of the solvents), such as hexane; 4) the polymerization occurs in one reaction zone; 5) scavengers (e.g., trialkyl aluminum compounds; free-radical scavengers such as Irganox® 1076) are absent (e.g., present at zero mol %), alternately the scavenger is present at a molar ratio of scavenger metal to transition metal of less than 100:1, such as less than 50:1, such as less than 15:1, such as less than 10:1); and 6) optionally, hydrogen is present in the polymerization reactor at a partial pressure of 0.001 psig to about 50 psig (about 0.000007 MPa to about 0.345 MPa), such as from about 0.01 psig to about 25 psig (about 0.00007 MPa to about 0.172 MPa), such as about 0.1 psig to about 10 psig (about 0.0007 MPa to about 0.069 MPa). Alternatively to the use of hydrogen, a quenching agent can be introduced to the reaction mixture (e.g., after the reaction mixture is withdrawn from the reactor). A quenching agent may be water, alcohol (e.g., methanol, ethanol), $CO_2$, ester, amine, or mixtures thereof. A quenching agent may also be a propionate, such as octadecyl 3-(3,5-di-tert-butyl-4-hydroxyphenyl)propionate.

The metal elements contained in the polymerization mixture, such as an aluminum and Zr or Hf, can be removed from the mixture. Removal thereof can be achieved through mechanical filtration using a filtration aid such as Celite or a fritted filter. Upon filtration, the liquid mixture can contain metal at a concentration no higher than 50 ppm by weight (such as no higher than 30 ppm, such as no higher than 20 ppm, such as no higher than 10 ppm, such as no higher than 5 ppm), based on the total weight of the liquid mixture.

Upon filtration, a mixture comprising monomer, UHMW PAO and the optional solvent is obtained. Residual components (e.g., monomer and solvent) can be removed by treating (e.g., kneading) the PAO product with a low boiling solvent (such as acetone) and/or can be removed by flashing or distillation at an elevated temperature and/or optionally under vacuum.

In at least one embodiment, the catalyst system used in the polymerization includes no more than one catalyst compound. A "reaction zone" also referred to as a "polymerization zone" is a vessel where polymerization takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone. Room temperature is 23° C. unless otherwise noted.

Other additives may also be used in the polymerization, such as one or more scavengers, promoters, modifiers, reducing agents, oxidizing agents, hydrogen, aluminum alkyls, or silanes.

The polymerization of $C_{10}$ to $C_{18}$ alpha-olefin(s) or $C_{10}$ to $C_{18}$ alpha-olefin-rich copolymers with $C_2$ to $C_{20}$ alpha-olefin comonomer(s) can produce polymer(s) with crystalline isotactic polypropylene runs. Without being bound by theory, it is believed this is so because a catalyst family, such as a QDA catalyst, has a seven-membered chelate ring, which effectively makes the catalyst $C_1$ symmetric (i.e., no symmetry).

Mw, Mn, Mw/Mn, and modality, are determined by using a High Temperature Gel Permeation Chromatography (Tosoh Bioscience LLC), equipped with a differential refractive index detector (DRI). Three high temperature TSK gel columns (Tosoh GMHHR-H(30)HT2) are used. The nominal flow rate is 1.0 mL/min, and the nominal injection volume is 300 µL. The various transfer lines, columns, and dual flow differential refractometer (the DRI detector) are contained in an oven maintained at 160° C. Solvent for the experiment is prepared by dissolving 1.2 grams of butylated hydroxytoluene as an antioxidant in 4 liters of Aldrich reagent grade 1, 2, 4 trichlorobenzene (TCB). The TCB mixture is then filtered through a 0.1 µm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 mg/mL to 2.0 mg/mL, with lower concentrations being used for higher molecular weight samples. Flow rate in the apparatus is then increased to 1.0 mL/minute, and the DRI is allowed to stabilize for 2 hours before injecting the first sample. The molecular weight is determined by combining universal calibration relationship with the column calibration which is performed with a series of monodispersed polystyrene (PS) standards. The MW is calculated at each elution volume with the following equation:

$$\log M_X = \frac{\log(K_X/K_{PS})}{a_X + 1} + \frac{a_{PS} + 1}{a_X + 1} \log M_{PS}$$

where the variables with subscript "X" stand for the test sample while those with subscript "PS" stand for PS. For polystyrene, $a_{PS}=0.67$ and $K_{PS}=0.000175$.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. Specifically, dn/dc=0.109 for both polyethylene and polypropylene.

The mass recovery is calculated from the ratio of the integrated area of the concentration chromatography over elution volume and the injection mass which is equal to the pre-determined concentration multiplied by injection loop volume.

In this method, $a_{PS}=0.67$ and $K_{PS}=0.000175$ while a and K are for other materials as calculated and published in literature (Sun, T. et al. *Macromolecules* 2001, v. 34, pg. 6812). Concentrations are expressed in g/cm³, molecular weight is expressed in g/mole, and intrinsic viscosity (hence K in the Mark-Houwink equation) is expressed in dL/g unless otherwise noted.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IRS analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=665 nm. Experimental and analysis details not described above, including how the detectors are calibrated and how to calculate the composition dependence of Mark-Houwink parameters and the second-virial coefficient, are described by T. Sun, et al. (2001) *Macromolecules*, v. 34(19), pp. 6812-6820.

Differential Scanning Calorimetry (DSC).

Melting Temperature, Tm, is measured by differential scanning calorimetry ("DSC") using a DSC2500 unit (TA Instruments). The sample is first equilibrated at 25° C. and subsequently heated to 0° C. using a heating rate of 10° C./min (first heat). The sample is held at 100° C. for 5 min. The sample is subsequently cooled down to −100° C. with a constant cooling rate of 10° C./min (first cool). The sample is equilibrated at −100° C. before being heated to 100° C. at a constant heating rate of 10° C./min (second heat). The endothermic peak of melting (second heat) is also analyzed using the TA TRIOS software and the peak melting temperature ($T_m$) corresponding to 10° C./min heating rate is determined.

Catalysts

Transition metal complexes for polymerization processes can include any olefin polymerization catalyst. Suitable catalyst components may include "non-metallocene complexes" that are defined to be transition metal complexes that do not feature a cyclopentadienyl anion or substituted cyclopentadienyl anion donors (e.g., cyclopentadienyl, fluorenyl, indenyl, methylcyclopentadienyl). Examples of families of non-metallocene complexes that may be suitable can include late transition metal pyridylbisimines (e.g., U.S. Pat. No. 7,087,686), group 4 pyridyldiamidos (e.g., U.S. Pat. No. 7,973,116), quinolinyldiamidos (e.g., US Pub. No. 2018/0002352 A1), pyridylamidos (e.g., U.S. Pat. No. 7,087,690), phenoxyimines (e.g., Accounts of Chemical Research 2009, v. 42, pp. 1532-1544), and bridged bi-aromatic complexes (e.g., U.S. Pat. No. 7,091,292), the disclosures of which are incorporated herein by reference.

Non-metallocene complexes can include iron complexes of tridentate pyridylbisimine ligands, zirconium and hafnium complexes of pyridylamido ligands, zirconium and hafnium complexes of tridentate pyridyldiamido ligands, zirconium and hafnium complexes of tridentate quinolinyldiamido ligands, zirconium and hafnium complexes of bidentate phenoxyimine ligands, and zirconium and hafnium complexes of bridged bi-aromatic ligands.

Suitable non-metallocene complexes can include zirconium and hafnium non-metallocene complexes. In at least one embodiment, non-metallocene complexes for the present disclosure include group 4 non-metallocene complexes including two anionic donor atoms and one or two neutral donor atoms. Suitable non-metallocene complexes for the present disclosure include group 4 non-metallocene complexes including an anionic amido donor. Suitable non-metallocene complexes for the present disclosure include group 4 non-metallocene complexes including an anionic aryloxide donor atom. Suitable non-metallocene complexes for the present disclosure include group 4 non-metallocene complexes including two anionic aryloxide donor atoms and two additional neutral donor atoms.

A catalyst compounds can be a quinolinyldiamido (QDA) transition metal complex represented by Formula (I), such as by Formula (II), such as by Formula (III):

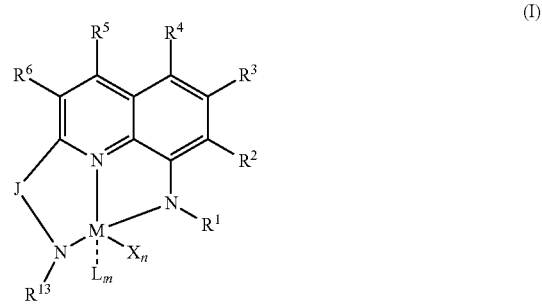

(I)

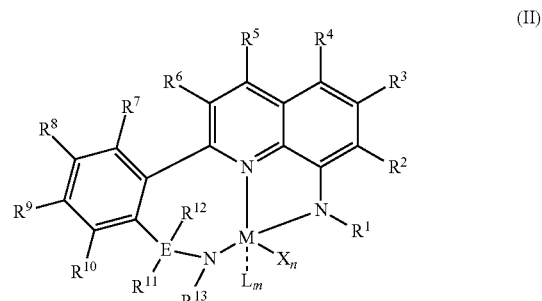

(II)

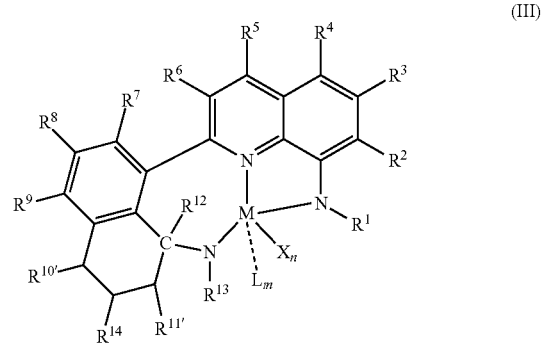

(III)

wherein:

M is a group 3, 4, 5, 6, 7, 8, 9, 10, 11, or 12 metal, such as a group 4 metal;

J is group including a three-atom-length bridge between the quinoline and the amido nitrogen, such as a group containing up to 50 non-hydrogen atoms;

E is carbon, silicon, or germanium;

X is an anionic leaving group, (such as a hydrocarbyl group or a halogen);

L is a neutral Lewis base;

$R^1$ and $R^{13}$ are independently selected from the group including of hydrocarbyls, substituted hydrocarbyls, and silyl groups;

$R^2$, $R^3$, $R^4$, $R^5$, $R^6$, $R^7$, $R^8$, $R^9$, $R^{10}$, $R^{10'}$, $R^{11}$, $R^{11'}$, $R^{12}$, and $R^{14}$ are independently hydrogen, hydrocarbyl, alkoxy, silyl, amino, aryloxy, substituted hydrocarbyl, halogen, or phosphino;

n is 1 or 2;

m is 0, 1, or 2, where n+m is not greater than 4; and any two R groups (e.g., $R^1$ & $R^2$, $R^2$ & $R^3$, $R^{10}$ and $R^{11}$, etc.) may be joined to form a substituted hydrocarbyl, unsubstituted hydrocarbyl, substituted heterocyclic, or unsubstituted heterocyclic, saturated or unsaturated ring, where the ring has 5, 6, 7, or 8 ring atoms and where substitutions on the ring can join to form additional rings;

any two X groups may be joined together to form a dianionic group;

any two L groups may be joined together to form a bidentate Lewis base; and any X group may be joined to an L group to form a monoanionic bidentate group.

In at least one embodiment, M is a group 4 metal, such as zirconium or hafnium, such as M is hafnium.

Representative non-metallocene transition metal compounds usable for forming poly(alpha-olefin)s of the present disclosure also include tetrabenzyl zirconium, tetra bis(trimethylsilymethyl) zirconium, oxotris(trimethlsilylmethyl) vanadium, tetrabenzyl hafnium, tetrabenzyl titanium, bis(hexamethyl disilazido)dimethyl titanium, tris(trimethyl silyl methyl) niobium dichloride, and tris(trimethylsilylmethyl) tantalum dichloride.

In at least one embodiment, J is an aromatic substituted or unsubstituted hydrocarbyl (such as a hydrocarbyl) having from 3 to 30 non-hydrogen atoms, such as J is represented by the formula:

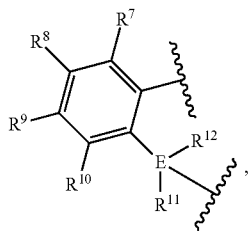

such as J is

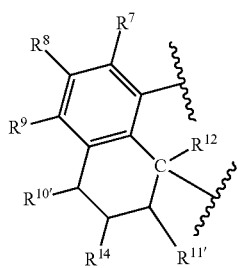

where $R^7$, $R^8$, $R^9$, $R^{10}$, $R^{10'}$, $R^{11}$, $R^{11'}$, $R^{12}$, $R^{14}$ and E are as defined above, and any two R groups (e.g., $R^7$ & $R^8$, $R^8$ & $R^9$, $R^9$ & $R^{10}$, $R^{10}$ & $R^{11}$, etc.) may be joined to form a substituted or unsubstituted hydrocarbyl or heterocyclic ring, where the ring has 5, 6, 7, or 8 ring atoms (such as 5 or 6 atoms), and said ring may be saturated or unsaturated (such as partially unsaturated or aromatic), such as J is an arylalkyl (such as arylmethyl, etc.) or dihydro-1H-indenyl, or tetrahydronaphthalenyl group.

In at least one embodiment, J is selected from the following structures:

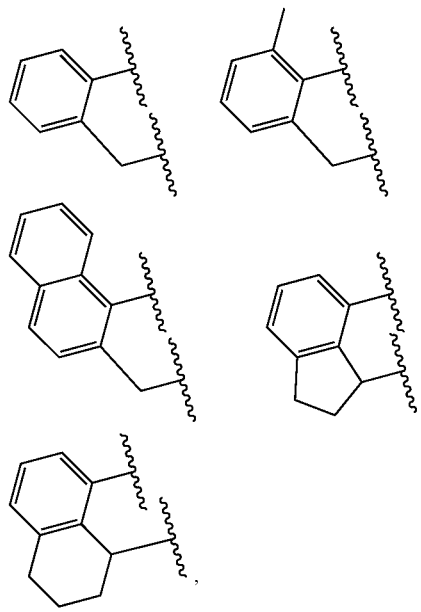

where $\xi$ indicates connection to the complex.

In at least one embodiment, E is carbon.

X may be an alkyl (such as alkyl groups having 1 to 10 carbons, such as methyl, ethyl, propyl, butyl, pentyl, hexyl, heptyl, octyl, nonyl, decyl, and isomers thereof), aryl, hydride, alkylsilane, fluoride, chloride, bromide, iodide, triflate, carboxylate, amido (such as $NMe_2$), or alkylsulfonate.

In at least one embodiment, L is an ether, amine or thioether.

In at least one embodiment, $R^7$ and $R^8$ are joined to form a six-membered aromatic ring with the joined $R^7/R^8$ group being —CH═CHCH═CH—.

$R^{10}$ and $R^{11}$ may be joined to form a five-membered ring with the joined $R^{10}R^{11}$ group being —$CH_2CH_2$—.

In at least one embodiment, $R^{10}$ and $R^{11}$ are joined to form a six-membered ring with the joined $R^{10}R^{11}$ group being —$CH_2CH_2CH_2$—.

$R^1$ and $R^{13}$ may be independently selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In at least one embodiment, the QDA transition metal complex represented by the Formula (II) above where:

M is a group 4 metal (such hafnium);

E is selected from carbon, silicon, or germanium (such as carbon);

X is an alkyl, aryl, hydride, alkylsilane, fluoride, chloride, bromide, iodide, triflate, carboxylate, amido, alkoxo, or alkylsulfonate;

L is an ether, amine, or thioether;

$R^1$ and $R^{13}$ are independently selected from the group consisting of hydrocarbyls, substituted hydrocarbyls, and silyl groups (such as aryl);

$R^2$, $R^3$, $R^4$, $R^5$, $R^6$, $R^7$, $R^8$, $R^9$, $R^{10}$, $R^{11}$, and $R^{12}$ are independently hydrogen, hydrocarbyl, alkoxy, silyl, amino, aryloxy, substituted hydrocarbyls, halogen, and phosphino;

n is 1 or 2;

m is 0, 1, or 2;

n+m is from 1 to 4;

two X groups may be joined together to form a dianionic group;

two L groups may be joined together to form a bidentate Lewis base;

an X group may be joined to an L group to form a monoanionic bidentate group;

$R^7$ and $R^8$ may be joined to form a ring (such as an aromatic ring, a six-membered aromatic ring with the joined $R^7R^8$ group being —CH=CHCH=CH—); and $R^{10}$ and $R^{11}$ may be joined to form a ring (such as a five-membered ring with the joined $R^{10}R^{11}$ group being —CH$_2$CH$_2$—, a six-membered ring with the joined $R^{10}R^{11}$ group being —CH$_2$CH$_2$CH$_2$—).

In at least one embodiment of Formula (I), (II), and (III), $R^4$, $R^5$, and $R^6$ are independently selected from the group including hydrogen, hydrocarbyls, substituted hydrocarbyls, alkoxy, aryloxy, halogen, amino, and silyl, and wherein adjacent R groups ($R^4$ and $R^5$ and/or $R^5$ and $R^6$) are joined to form a substituted hydrocarbyl, unsubstituted hydrocarbyl, unsubstituted heterocyclic ring or substituted heterocyclic ring, where the ring has 5, 6, 7, or 8 ring atoms and where substitutions on the ring can join to form additional rings.

In at least one embodiment of Formula (I), (II), and (III), $R^7$, $R^8$, $R^9$, and $R^{19}$ are independently selected from the group including hydrogen, hydrocarbyls, substituted hydrocarbyls, alkoxy, halogen, amino, and silyl, and wherein adjacent R groups ($R^7$ and $R^8$ and/or $R^9$ and $R^{10}$) may be joined to form a saturated, substituted hydrocarbyl, unsubstituted hydrocarbyl, unsubstituted heterocyclic ring or substituted heterocyclic ring, where the ring has 5, 6, 7, or 8 ring carbon atoms and where substitutions on the ring can join to form additional rings.

In at least one embodiment of Formula (I), (II), and (III), $R^2$ and $R^3$ are each, independently, selected from the group including hydrogen, hydrocarbyls, and substituted hydrocarbyls, alkoxy, silyl, amino, aryloxy, halogen, and phosphino, $R^2$ and $R^3$ may be joined to form a saturated, substituted or unsubstituted hydrocarbyl ring, where the ring has 4, 5, 6, or 7 ring carbon atoms and where substitutions on the ring can join to form additional rings, or $R^2$ and $R^3$ may be joined to form a saturated heterocyclic ring, or a saturated substituted heterocyclic ring where substitutions on the ring can join to form additional rings.

In at least one embodiment of Formula (I), (II), and (III), $R^{11}$ and $R^{12}$ are each, independently, selected from the group including hydrogen, hydrocarbyls, and substituted hydrocarbyls, alkoxy, silyl, amino, aryloxy, halogen, and phosphino, $R^{11}$ and $R^{12}$ may be joined to form a saturated, substituted or unsubstituted hydrocarbyl ring, where the ring has 4, 5, 6, or 7 ring carbon atoms and where substitutions on the ring can join to form additional rings, or $R^{11}$ and $R^{12}$ may be joined to form a saturated heterocyclic ring, or a saturated substituted heterocyclic ring where substitutions on the ring can join to form additional rings, or $R^{11}$ and $R^{10}$ may be joined to form a saturated heterocyclic ring, or a saturated substituted heterocyclic ring where substitutions on the ring can join to form additional rings.

In at least one embodiment of Formula (I), (II), and (III), $R^1$ and $R^{13}$ are independently selected from phenyl groups that are variously substituted with between zero to five substituents that include F, Cl, Br, I, CF$_3$, NO$_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In at least one embodiment of Formula (II), suitable $R^{12}$-E-$R^{11}$ groups include CH$_2$, CMe$_2$, SiMe$_2$, SiEt$_2$, SiPr$_2$, SiBu$_2$, SiPh$_2$, Si(aryl)$_2$, Si(alkyl)$_2$, CH(aryl), CH(Ph), CH(alkyl), and CH(2-isopropylphenyl), where alkyl is a C$_1$ to C$_{40}$ alkyl group (such as C$_1$ to C$_{20}$ alkyl, such as one or more of methyl, ethyl, propyl, butyl, pentyl, hexyl, heptyl, octyl, nonyl, decyl, undecyl, dodecyl, and isomers thereof), aryl is a C$_5$ to C$_{40}$ aryl group (such as a C$_6$ to C$_{20}$ aryl group, such as phenyl or substituted phenyl, such as phenyl, 2-isopropylphenyl, or 2-tertbutylphenyl).

In at least one embodiment of Formula (III), $R^{11}$, $R^{12}$, $R^9$, $R^{14}$, and $R^{19}$ are independently selected from the group consisting of hydrogen, hydrocarbyls, substituted hydrocarbyls, alkoxy, halogen, amino, and silyl, and wherein adjacent R groups ($R^{10}$ and $R^{14}$, and/or $R^{11}$ and $R^{14}$, and/or $R^9$ and $R^{10}$) may be joined to form a saturated, substituted hydrocarbyl, unsubstituted hydrocarbyl, unsubstituted heterocyclic ring or substituted heterocyclic ring, where the ring has 5, 6, 7, or 8 ring carbon atoms and where substitutions on the ring can join to form additional rings.

The R groups above (i.e., any of $R^2$ to $R^{14}$) and other R groups mentioned hereafter may contain from 1 to 30, such as 2 to 20 carbon atoms, such as from 6 to 20 carbon atoms. The R groups above (i.e., any of $R^2$ to $R^{14}$) and other R groups mentioned hereafter, may be independently selected from the group including hydrogen, methyl, ethyl, phenyl, isopropyl, isobutyl, trimethylsilyl, and —CH$_2$—Si(Me)$_3$.

In at least one embodiment, the quinolinyldiamide complex is linked to one or more additional transition metal complex, such as a quinolinyldiamide complex or another suitable non-metallocene, through an R group in such a fashion as to make a bimetallic, trimetallic, or multimetallic complex that may be used as a catalyst component for olefin polymerization. The linker R-group in such a complex may contain 1 to 30 carbon atoms.

In at least one embodiment, E is carbon and $R^{11}$ and $R^{12}$ are independently selected from phenyl groups that are substituted with 0, 1, 2, 3, 4, or 5 substituents selected from the group consisting of F, Cl, Br, I, CF$_3$, NO$_2$, alkoxy, dialkylamino, hydrocarbyl, and substituted hydrocarbyl groups with from one to ten carbons.

In at least one embodiment of Formula (II) or (III), $R^{11}$ and $R^{12}$ are independently selected from hydrogen, methyl, ethyl, phenyl, isopropyl, isobutyl, —CH$_2$—Si(Me)$_3$, and trimethylsilyl.

In at least one embodiment of Formula (II) or (III), $R^7$, $R^8$, $R^9$, and $R^{10}$ are independently selected from hydrogen, methyl, ethyl, propyl, isopropyl, phenyl, cyclohexyl, fluoro, chloro, methoxy, ethoxy, phenoxy, —CH$_2$—Si(Me)$_3$, and trimethylsilyl.

In at least one embodiment of Formula (I), (II) or (III), $R^2$, $R^3$, $R^4$, $R^5$, and $R^6$ are independently selected from the group consisting of hydrogen, hydrocarbyls, alkoxy, silyl, amino, substituted hydrocarbyls, and halogen.

In at least one embodiment of Formula (III), $R^{10}$, $R^{11}$ and $R^{14}$ are independently selected from hydrogen, methyl, ethyl, phenyl, isopropyl, isobutyl, —CH$_2$—Si(Me)$_3$, and trimethylsilyl.

In at least one embodiment of Formula (I), (II) or (III), each L is independently selected from Et$_2$O, MeOtBu, Et$_3$N, PhNMe$_2$, MePh$_2$N, tetrahydrofuran, and dimethylsulfide.

In at least one embodiment of Formula (I), (II) or (III), each X is independently selected from methyl, benzyl, trimethylsilyl, neopentyl, ethyl, propyl, butyl, phenyl, hydrido, chloro, fluoro, bromo, iodo, dimethylamido, diethylamido, dipropylamido, and diisopropylamido.

In at least one embodiment of Formula (I), (II) or (III), R$^1$ is 2,6-diisopropylphenyl, 2,4,6-triisopropylphenyl, 2,6-diisopropyl-4-methylphenyl, 2,6-diethylphenyl, 2-ethyl-6-isopropylphenyl, 2,6-bis(3-pentyl)phenyl, 2,6-dicyclopentylphenyl, or 2,6-dicyclohexylphenyl.

In at least one embodiment of Formula (I), (II) or (III), R$^{13}$ is phenyl, 2-methylphenyl, 2-ethylphenyl, 2-propylphenyl, 2,6-dimethylphenyl, 2-isopropylphenyl, 4-methylphenyl, 3,5-dimethylphenyl, 3,5-di-tert-butylphenyl, 4-fluorophenyl, 3-methylphenyl, 4-dimethylaminophenyl, or 2-phenylphenyl.

In at least one embodiment of Formula (II), J is dihydro-1H-indenyl and R$^1$ is 2,6-dialkylphenyl or 2,4,6-trialkylphenyl.

In at least one embodiment of Formula (I), (II) or (III), R$^1$ is 2,6-diisopropylphenyl and R$^{13}$ is a hydrocarbyl group containing 1, 2, 3, 4, 5, 6, or 7 carbon atoms.

Ligand Synthesis

The quinolinyldiamine ligands described herein can be prepared as follow: the main process in the synthesis of the quinolinyldiamine ligand is the carbon-carbon bond coupling shown below in Scheme 1, where fragment 1 and fragment 2 are joined together in a transition metal mediated reaction. In the specific examples described herein the coupling reaction involves the use of Pd(PPh$_3$)$_4$, but other transition metal catalysts (e.g., Ni or Cu containing complexes) are also suitable for this type of coupling reaction. W* and Y* groups used can be a boronic acid ester and a halide, respectively. This choice was suitable for the Pd-mediated coupling step, but other groups may also be useful for the coupling reaction. Other possible W* and Y* groups of interest include alkali metal (e.g., Li), alkaline earth metal halide (e.g., MgBr), zinc halide (e.g., ZnCl), zincate, halide, and triflate. In Scheme 1, R$^1$ through R$^{13}$ and E are as described above.

Scheme 1

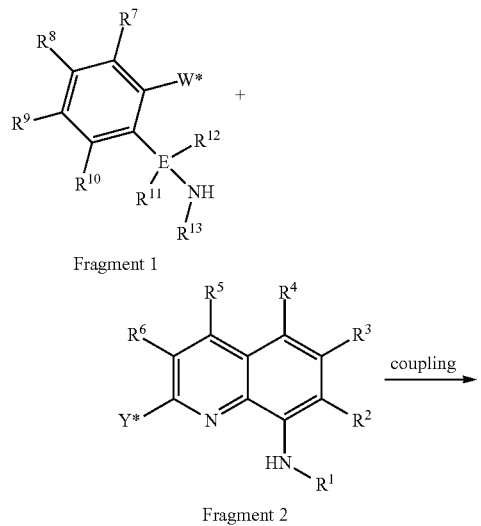

Fragment 1

Fragment 2

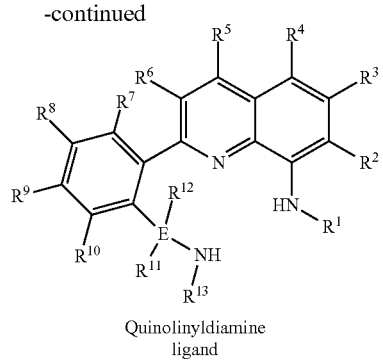

Quinolinyldiamine ligand

An alternative method for the preparation of a quinolinyldiamine ligand is by reaction of a dihalogenated quinoline (e.g. 8-bromo-2-chloroquinoline, 2-bromo-8-chloroquinoline, 2,8-dibromoquinoline) in two successive coupling steps: one step to form the quinoline-amine bond, and an additional coupling to introduce Fragment 1 of the type shown in Scheme 1. The introduction of the quinoline-amine can be envisioned to occur in a Buchwald-Hartwig type coupling, whereas the formation of the quinonine-Fragment 1 bond could occur by various catalyzed methods including Suzuki, Kumada, and Negishi-type couplings.

One method for the preparation of transition metal quinolinyldiamide complexes is by reaction of the quinolinyldiamine ligand with a metal reactant containing anionic basic leaving groups. Suitable anionic basic leaving groups may include dialkylamido, benzyl, phenyl, hydrido, and methyl. In this reaction, the role of the basic leaving group is to deprotonate the quinolinyldiamine ligand. Suitable metal reactants for this type of reaction include, but are not limited to, HfBn$_4$ (Bn=CH$_2$Ph), ZrBn$_4$, TiBn$_4$, ZrBn$_2$Cl$_2$(OEt$_2$), HfBn$_2$Cl$_2$(OEt$_2$)$_2$, Zr(NMe$_2$)$_2$Cl$_2$(dimethoxyethane), Hf(NMe$_2$)$_2$Cl$_2$(dimethoxyethane), Hf(NMe$_2$)$_4$, Zr(NMe$_2$)$_4$, and Hf(NEt$_2$)$_4$. For example, Hf(NMe$_2$)$_4$ can be reacted with a quinolinyldiamine ligand at elevated temperatures to form the quinolinyldiamide complex with the formation of two molar equivalents of dimethylamine, which is lost or removed before the quinolinyldiamide complex is isolated.

A second method for the preparation of transition metal quinolinyldiamide complexes is by reaction of the quinolinyldiamine ligand with an alkali metal or alkaline earth metal base (e.g., BuLi, EtMgBr) to deprotonate the ligand, followed by reaction with a metal halide (e.g., HfCl$_4$, ZrCl$_4$).

Quinolinyldiamide (QDA) metal complexes that contain metal-halide, alkoxide, or amido leaving groups may be alkylated by reaction with organolithium, Grignard, and organoaluminum reagents as shown in Scheme 2. In the alkylation reaction the alkyl groups are transferred to the QDA metal center and the leaving groups are removed. In Scheme 2, R$^1$ through R$^{13}$ and E are as described above and X* is a halide, alkoxide, or dialkylamido leaving group. Suitable reagents for the alkylation reaction may include, but are not limited to, MeLi, MeMgBr, AlMe$_3$, AliBu$_3$, AlOct$_3$, and PhCH$_2$MgCl. About 2 molar equivalents to 20 molar equivalents of the alkylating reagent are added to the QDA complex. The alkylations may be performed in etherial or hydrocarbon solvents or solvent mixtures at temperatures ranging from −80° C. to 70° C.

Scheme 2

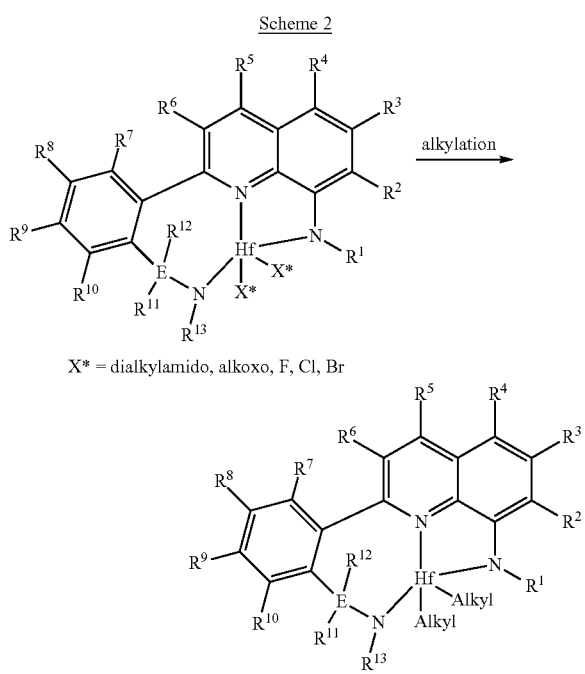

X* = dialkylamido, alkoxo, F, Cl, Br

An exemplary catalyst used for polymerizations of the present disclosure is (QDA-1)HfMe$_2$, as described in US Pub. No. 2018/0002352 A1.

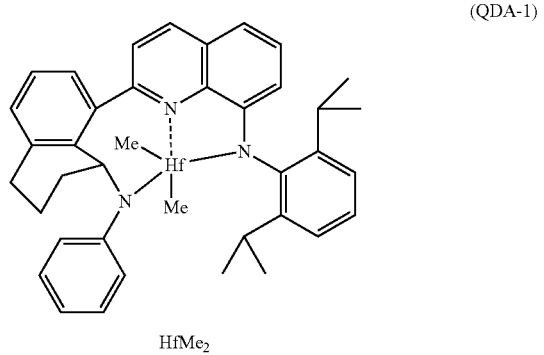

The catalyst system including (QDA-1)HfMe$_2$ can be isotactic specific, hence poly(alpha-olefins) polymers produced using (QDA-1)HfMe$_2$ can be isotactic poly(alpha-olefins).

Activators

The terms "cocatalyst" and "activator" are used herein interchangeably and are defined to be a compound which can activate one or more of the catalyst compounds described above by converting the neutral catalyst compound to a catalytically active catalyst compound cation.

After the complexes have been synthesized, catalyst systems may be formed by combining the complexes with activators in any suitable manner including by supporting them for use in slurry or gas phase polymerization. The catalyst systems may also be added to or generated in solution polymerization or bulk polymerization (in the monomer). Suitable catalyst system may include a complex as described above and an activator such as alumoxane or a non-coordinating anion.

Non-limiting activators, for example, include alumoxanes, aluminum alkyls, ionizing activators, which may be neutral or ionic, and other suitable cocatalysts. Suitable activators may include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane Activators

In at least one embodiment, alumoxane activators are utilized as an activator in the catalyst system. The alkylalumoxane may be used with another activator. Alumoxanes are generally oligomeric compounds containing —Al(R$^1$)—O— sub-units, where IV is an alkyl group. Examples of alumoxanes include methylalumoxane (MAO), modified methylalumoxane (MMAO), ethylalumoxane, and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. In at least one embodiment, a visually clear methylalumoxane can be used. A cloudy or gelled alumoxane can be filtered to produce a clear solution or clear alumoxane can be decanted from the cloudy solution. Suitable alumoxane can be a modified methyl alumoxane (MMAO) cocatalyst type 3A (commercially available from Akzo Chemicals, Inc. under the trade name Modified Methylalumoxane type 3A, covered under U.S. Pat. No. 5,041,584).

Another suitable alumoxane is solid polymethylaluminoxane as described in U.S. Pat. Nos. 9,340,630; 8,404,880; and 8,975,209.

When the activator is an alumoxane (modified or unmodified), embodiments may include the maximum amount of activator such as at up to about a 5,000-fold molar excess Al/M over the catalyst compound (per metal catalytic site). The minimum activator-to-catalyst-compound is about a 1:1 molar ratio. Alternate suitable ranges include from about 1:1 to about 500:1, alternately from about 1:1 to about 200:1, alternately from about 1:1 to about 100:1, or alternately from about 1:1 to about 50:1. In an alternate embodiment, little or no alumoxane is used in the polymerization processes described herein. In at least one embodiment, alumoxane is present at about zero mole %, alternately the alumoxane is present at a molar ratio of aluminum to catalyst compound transition metal less than about 500:1, such as less than about 300:1, such as less than about 100:1, such as less than about 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any suitable metal or metalloid that can form a compatible, weakly coordinating complex may be used or contained in the non-coordinating anion. Suitable metals include aluminum, gold, and platinum. Suitable metalloids include boron, aluminum, phosphorus, and silicon.

"Compatible" non-coordinating anions can be those which are not degraded to neutrality when the initially formed complex decomposes, and the anion does not transfer an anionic substituent or fragment to the cation so as to cause it to form a neutral transition metal compound and a neutral by-product from the anion. Non-coordinating anions useful in accordance with this present disclosure are those that are compatible, stabilize the transition metal cation in the sense of balancing its ionic charge at +1, and yet retain sufficient lability to permit displacement during polymerization.

It is within the scope of the present disclosure to use an ionizing activator, neutral or ionic, such as tri(n-butyl) ammonium tetrakis(pentafluorophenyl)borate, a tris perfluorophenyl boron metalloid precursor or a tris perfluoronaphthyl boron metalloid precursor, polyhalogenated heteroborane anions (WO 1998/043983), boric acid (U.S. Pat. No. 5,942,459), or combination thereof. It is also within the scope of the present disclosure to use neutral or ionic activators alone or in combination with alumoxane or modified alumoxane activators.

The catalyst systems of the present disclosure can include at least one non-coordinating anion (NCA) activator.

In at least one embodiment, boron containing NCA activators represented by the formula below is used:

where: Z is (L-H) or a reducible Lewis acid; L is a neutral Lewis base; H is hydrogen; (L-H)$^+$ is a Brønsted acid; A$^{d-}$ is a non-coordinating anion, for example a boron containing non-coordinating anion having the charge d−; and d is 1, 2, or 3.

The cation component, $Z_d^+$ may include Brønsted acids such as protons or protonated Lewis bases or reducible Lewis acids capable of protonating or abstracting a moiety, such as an alkyl or aryl, from the bulky ligand containing transition metal catalyst precursor, resulting in a cationic transition metal species.

The activating cation $Z_d^+$ may also be a moiety such as silver, tropylium, carbenium, ferroceniums and mixtures, such as carbeniums and ferroceniums, such as $Z_d^+$ is triphenyl carbenium. Suitable reducible Lewis acids can be a triaryl carbenium (where the aryl can be substituted or unsubstituted, such as those represented by the formula: (Ar$_3$C$^+$), where Ar is aryl substituted with a C$_1$ to C$_{40}$ hydrocarbyl or with a substituted C$_1$ to C$_{40}$ hydrocarbyl, or a heteroaryl substituted with a C$_1$ to C$_{40}$ hydrocarbyl, or with a substituted C$_1$ to C$_{40}$ hydrocarbyl; such as the reducible Lewis acids in "Z" include those represented by the formula: (Ph$_3$C), where Ph is a substituted or unsubstituted phenyl, such as substituted with C$_1$ to C$_{40}$ hydrocarbyls or substituted a C$_1$ to C$_{40}$ hydrocarbyls, such as C$_1$ to C$_{20}$ alkyls or aromatics or substituted C$_1$ to C$_{20}$ alkyls or aromatics, such as Z is a triphenylcarbenium.

When $Z_d^+$ is the activating cation (L-H)$_d^+$, such as a Brønsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component A$^{d-}$ includes those having the formula [M$^{k+}$Q$_n$]$^{d-}$ wherein k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. In at least one embodiment, each Q is a fluorinated hydrocarbyl group having 1 to 20 carbon atoms, such as each Q is a fluorinated aryl group, such as each Q is a pentafluoryl aryl group. Examples of suitable A$^{d-}$ also include diboron compounds as disclosed in U.S. Pat. No. 5,447,895, which is fully incorporated herein by reference.

Examples of boron compounds which may be used as an activating cocatalyst include the compounds described as (and particularly those specifically listed as) activators in U.S. Pat. No. 8,658,556, which is incorporated by reference herein.

Bulky activators are also useful herein as NCAs. "Bulky activator" as used herein refers to anionic activators represented by the formula:

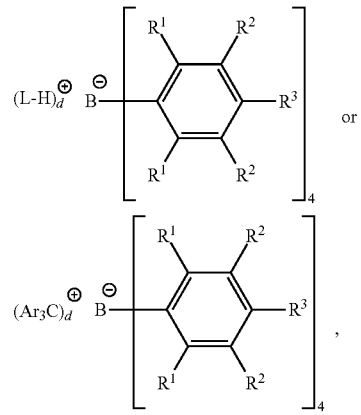

wherein:

each R$^1$ is, independently, a halide, such as a fluoride;

Ar is a substituted or unsubstituted aryl group (such as a substituted or unsubstituted phenyl), such as substituted with C$_1$ to C$_{40}$ hydrocarbyls, such as C$_1$ to C$_{20}$ alkyls or aromatics;

each R$^2$ is, independently, a halide, a C$_6$ to C$_{20}$ substituted aromatic hydrocarbyl group or a siloxy group of the formula —O—Si—R$^a$, where R$^a$ is a C$_1$ to C$_{20}$ hydrocarbyl or hydrocarbylsilyl group (such as R$^2$ is a fluoride or a perfluorinated phenyl group);

each R$^3$ is a halide, C$_6$ to C$_{20}$ substituted aromatic hydrocarbyl group or a siloxy group of the formula —O—Si—R$^a$, where R$^a$ is a C$_1$ to C$_{20}$ hydrocarbyl or hydrocarbylsilyl group (such as R$^3$ is a fluoride or a C$_6$ perfluorinated aromatic hydrocarbyl group); wherein R$^2$ and R$^3$ can form one or more saturated or unsaturated, substituted or unsubstituted rings (such as R$^2$ and R$^3$ form a perfluorinated phenyl ring);

L is a neutral Lewis base; (L-H)$^+$ is a Brønsted acid; d is 1, 2, or 3;

wherein the anion has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

Suitable $(Ar_3C)_d^+$ is $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," *Journal of Chemical Education*, v. 71(11), November 1994, pp. 962-964. Molecular volume (MV), in units of cubic Å, is calculated using the formula: $MV=8.3 V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators as described in U.S. Pat. No. 8,658,556, which is incorporated by reference herein.

In at least one embodiment, one or more of the NCA activators is chosen from the activators described in U.S. Pat. No. 6,211,105.

Suitable activators, such as ionic activators $Z_d^+(A^{d-})$, may include, but are not limited to, one or more of triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl)borate), trialkylammonium tetrakis(pentafluorophenyl)borate, N,N-dialkylanilinium tetrakis(pentafluorophenyl)borate, N,N-dialkyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4, 6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, dialkylammonium tetrakis(pentafluorophenyl)borate, (where alkyl is methyl, ethyl, propyl, n-butyl, iso-butyl, or t-butyl). In at least one embodiment, the ionic activator $Z_d^+(A^{d-})$ is one or more of N,N-dimethylanilinium tetrakis(perfluorophenyl)borate, triphenylcarbenium tetrakis (perfluorophenyl)borate, $[Me_3NH^+][B(C_6F_5)_4^-]$, 1-(4-(tris (pentafluorophenyl)borate)-2,3,5,6-tetrafluorophenyl)pyrrolidinium, 4-(tris(pentafluorophenyl)borate)-2,3,5,6-tetrafluoropyridine, N,N-dimethylanilinium tetrakis (perfluoronaphthyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3, 5-bis(trifluoromethyl)phenyl)borate, trimethylammonium tetrakis(perfluoronaphthyl)borate, triethylammonium tetrakis(perfluoronaphthyl)borate, tripropylammonium tetrakis (perfluoronaphthyl)borate, tri(n-butyl)ammonium tetrakis (perfluoronaphthyl)borate, tri(t-butyl)ammonium tetrakis (perfluoronaphthyl)borate, N,N-diethylanilinium tetrakis (perfluoronaphthyl)borate, N,N-dimethyl-(2,4,6-trimethylanilinium) tetrakis(perfluoronaphthyl)borate, and tropillium tetrakis(perfluoronaphthyl)borate.

Suitable activator-to-catalyst ratio, e.g., all NCA activators-to-catalyst ratio is about a 1:1 molar ratio. Alternate suitable ranges include from about 0.1:1 to about 100:1, alternately from about 0.5:1 to about 200:1, alternately from about 1:1 to about 500:1, alternately from about 1:1 to about 1000:1. A particularly useful range is from about 0.5:1 to about 10:1, such as about 1:1 to about 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 which discuss the use of an alumoxane in combination with an ionizing activator).

Alternately, a co-activator, such as a group 1, 2, or 13 organometallic species (e.g., an alkyl aluminum compound such as tri-n-octyl aluminum), may also be used in the catalyst system herein. The complex-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

In at least one embodiment, the activator is N,N-dimethylanilinium tetrakis(pentafluorophenyl)borate (BF20).

Scavengers or Optional Co-Activators

In addition to these activator compounds, one or more scavengers or co-activators may be used in the catalyst system. Aluminum alkyl or organoaluminum compounds which may be utilized as scavengers or co-activators include, for example, trimethylaluminum, triethylaluminum, triisobutylaluminum, tri-n-hexylaluminum, and tri-n-octylaluminum.

Polymerization conditions of the present disclosure to produce poly(alpha-olefin)s can be tailored according to the choice of the scavenger(s) involved in the polymerization process dictated by the reaction temperature chosen. Suitable scavengers used for or near to room temperature polymerization processes (e.g., polymerization temperature of 25° C.) may differ from the suitable scavengers used for higher temperature polymerization processes (e.g., polymerization temperature of 70° C.).

In at least one embodiment, when using the complexes described herein, particularly when they are immobilized on a support, the catalyst system will additionally include one or more scavenging compounds. Here, the term "scavenging compound" means a compound that removes polar impurities from the reaction environment. These impurities adversely affect catalyst activity and stability. Suitable the scavenging compound can be an organometallic compound such as the group 13 organometallic compounds of U.S. Pat. Nos. 5,153,157; 5,241,025; WO 1991/009882; WO 1994/003506; WO 1993/014132; and that of WO 1995/007941. Exemplary compounds may include triethyl aluminum, triethyl borane, tri-iso-butyl aluminum, methyl alumoxane, iso-butyl alumoxane, and tri-n-octyl aluminum. Those scavengers having bulky or $C_6$ to $C_{20}$ linear hydrocarbyl substituents connected to the metal or metalloid center usually minimize adverse interaction with the active catalyst. Examples may include triethylaluminum, such as bulky compounds, such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

For purposes of the present disclosure, suitable aluminum scavengers may include those where there is an oxygen present. That is, the material per se or the aluminum mixture used as a scavenger, includes an aluminum/oxygen species, such as an alumoxane or alkylaluminum oxides, e.g., dialkyaluminum oxides, such as bis(diisobutylaluminum) oxide. In one aspect, aluminum containing scavengers can be represented by the formula $((R_z\text{—}Al\text{—})_y O\text{—})_x$, wherein z is 1-2, y is 1-2, x is 1-100, and R is a $C_1$-$C_{12}$ hydrocarbyl group. In another aspect, the scavenger has an oxygen to aluminum (O/Al) molar ratio of from about 0.25 to about 1.5, such as from about 0.5 to about 1.

In at least one embodiment, two or more complexes are combined with aluminum scavengers in the same reactor with monomer. Alternately, one or more complexes can be combined with another catalyst (such as a non-metallocene) and aluminum scavengers in the same reactor with monomer.

Suitable aluminum alkyl or organoaluminum compounds which may be utilized as co-activators include, for example, trimethylaluminum, triethylaluminum, tri-iso-butylaluminum, tri-n-hexylaluminum, or tri-n-octylaluminum. In at least one embodiment, the co-activators are present at less than about 14 wt %, or from about 0.1 to about 10 wt %, or from about 0.5 to about 7 wt %, by weight of the catalyst system. Alternately, the complex-to-co-activator molar ratio is from about 1:100 to about 100:1; about 1:75 to about 75:1; about 1:50 to about 50:1; about 1:25 to about 25:1; about 1:15 to about 15:1; about 1:10 to about 10:1; about 1:5 to about 5:1; about 1:2 to about 2:1; about 1:100 to about 1:1; about 1:75 to about 1:1; about 1:50 to about 1:1; about 1:25 to about 1:1; about 1:15 to about 1:1; about 1:10 to about 1:1; about 1:5 to about 1:1; about 1:2 to about 1:1; about 1:10 to about 2:1.

End Uses

Blends

In another embodiment, a poly(alpha-olefin) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as the polyethylene or polypropylene) is present in the above blends, at from about 10 wt % to about 99 wt %, based upon the weight of the polymers in the blend, such as about 20 wt % to about 95 wt %, such as at least about 30 wt % to about 90 wt %, such as at least about 40 to about 90 wt %, such as at least about 50 wt % to about 90 wt %, such as at least about 60 to about 90 wt %, such as at least about 70 wt % to about 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

This invention further relates to:

1. A poly(alpha-olefin) comprising about 95 wt % or greater $C_{10}$-$C_{18}$ alpha-olefin content and having a weight average molecular weight of from about 1,000,000 g/mol to about 10,000,000 g/mol.

2. The poly(alpha-olefin) of paragraph 1, wherein the poly(alpha-olefin) has a weight average molecular weight of from about 1,600,000 g/mol to about 6,500,000 g/mol.

3. The poly(alpha-olefin) of paragraph 1, wherein the poly(alpha-olefin) has a number average molecular weight of from about 400,000 g/mol to about 6,000,000 g/mol.

4. The poly(alpha-olefin) of any of paragraphs 1 to 3, wherein the poly(alpha-olefin) is selected from a poly(1-decene), a poly(1-dodecene), a poly(1-tetradecene), a poly(1-octadecene).

5. The poly(alpha-olefin) of any of paragraphs 1 to 4, wherein the poly(alpha-olefin) is a random copolymer.

6. The poly(alpha-olefin) of any of paragraphs 1 to 5, wherein the poly(alpha-olefin) has a comonomer content of greater than 0 wt % to about 5 wt %, and the comonomer is ethylene, propylene, or a mixture thereof.

7. The poly(alpha-olefin) of any of paragraphs 1 to 5, wherein the poly(alpha-olefin) has a comonomer content of greater than 0 wt % to about 5 wt %, and the comonomer is a $C_{10}$-$C_{18}$ alpha-olefin, or a mixture thereof.

8. The poly(alpha-olefin) of any of paragraphs 1 to 7, wherein the poly(alpha-olefin) has an Mw/Mn value of from about 1 to about 3.

9. The poly(alpha-olefin) of paragraph 8, wherein the poly(alpha-olefin) has an Mw/Mn value of from about 1.4 to about 2.6.

10. The poly(alpha-olefin) of any of paragraphs 1 to 9, wherein the poly(alpha-olefin) has an entanglement mass Me of from about 1 kg/mol to about 200 kg/mol.

11. The poly(alpha-olefin) of paragraph 10, wherein the poly(alpha-olefin) has an entanglement mass Me of from about 10 kg/mol to about 125 kg/mol.

12. The poly(alpha-olefin) of any of paragraphs 1 to 11, wherein the poly(alpha-olefin) has a first melt and a second melt according to differential scanning calorimetry.

13. The poly(alpha-olefin) of any of paragraphs 1 to 12, wherein the poly(alpha-olefin) has a melting temperature (Tm) of from 0° C. to about 100° C.

14. The poly(alpha-olefin) of paragraph 13, wherein the poly(alpha-olefin) has a melting temperature (Tm) of from about −1° C. to about 60° C.

15. The poly(alpha-olefin) of any of paragraphs 1 to 14, wherein the poly(alpha-olefin) has a glass transition temperature $T_g$ value of from about from about −70° C. to about −65° C.

16. The poly(alpha-olefin) of any of paragraphs 1 to 15, wherein the poly(alpha-olefin) has a complex viscosity (measured at 60° C.) of from about 30 Pa·s to about 5,000,000 Pa·s and an extensional viscosity (measured at 60° C.) of from about 1,000 Pa·s to about 5,000,000 Pa·s.

17. The poly(alpha-olefin) of any of paragraphs 1 to 16, wherein the poly(alpha-olefin) has a maximum stress value of from about 5 MPa to about 9 MPa at a 500% strain.

18. The poly(alpha-olefin) of any of paragraphs 1 to 17, wherein the poly(alpha-olefin) has a tensile strength (measured at room temperature) of from about 1 MPa to about 3 MPa at the maximum stress (maximum strain of 100%).

19. The poly(alpha-olefin) of any of paragraphs 1 to 18, wherein the poly(alpha-olefin) has at least 10% isotactic pentads.

20. The poly(alpha-olefin) of paragraph 19, wherein the poly(alpha-olefin) has at least 40% isotactic pentads.

21. A method for forming a poly(alpha-olefin), the method comprising:

introducing one or more $C_{10}$-$C_{18}$ alpha-olefins to a scavenger and a catalyst system comprising a catalyst compound and an activator; and obtaining a poly(alpha-olefin) comprising about 95 wt % or greater $C_{10}$-$C_{18}$ alpha-olefin content and having a weight average molecular weight of from about 1,000,000 g/mol to about 10,000,000 g/mol.

22. The method of paragraph 21, wherein the catalyst is:

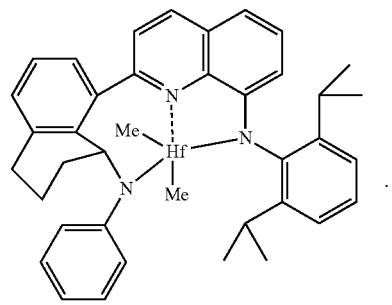

23. The method of paragraph 21 or paragraph 22, wherein the poly(alpha-olefin) has a number average molecular weight of from about 300,000 g/mol to about 1,000,000 g/mol.

24. The method of any of paragraphs 21 to 23, wherein introducing is performed at a temperature of from about 20° C. to about 30° C.

25. The method of any of paragraphs 21 to 23, wherein introducing is performed at a temperature of from about 50° C. to about 70° C.

EXAMPLES

Reagents and Starting Materials. Unless stated otherwise, all manipulations were performed under an inert atmosphere using standard glove box and or Schlenk line techniques. Solvents (e.g., hexane, toluene, o-xylene, acetone) and deuterated solvents were sparged with nitrogen and dried over 3 Angstrom molecular sieves prior to use. Unless stated otherwise, alpha olefins and other reagents were purchased from Sigma-Aldrich, Alfa Aesar, TCI, Gelest, Akzo Nobel, or Strem Chemical and used as received. The quinolinyldiamine ligand 2-(8-anilino-5,6,7,8-tetrahydronaphthalen-1-yl)-N-(2,6-diisopropylphenyl)quinolin-8-amine was prepared as described in US Patent Publication No. 2018/0002352 A1.

Poly(1-alkene) samples are prepared by organometallic polymerization of 1-alkene ($C_nH_{2n}$) where n is an integer from 10 to 18. Elastomeric poly(1-alkene) samples were prepared by the polymerization of 1-alkene using a catalyst including a group 4 quinolinyldiamide complex and an activator. The catalyst system can produce isotactic poly(1-alkene)s. The structure of quinolinyldiamide complex (QDA-1)HfMe$_2$ and N,N-dimethylanilinium tetrakis(pentafluorophenyl)borate (Activator 1) are shown below.

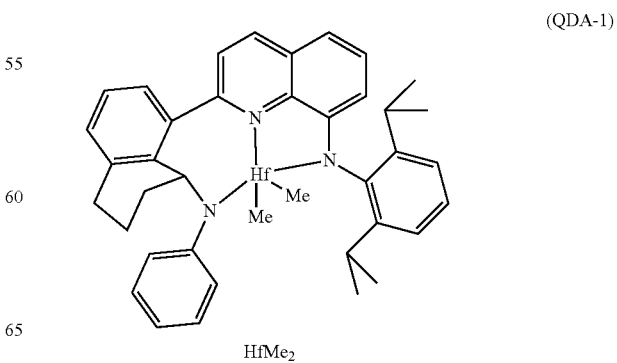

(QDA-1)

HfMe$_2$

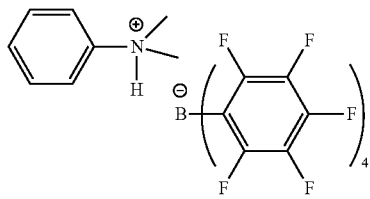

Activator 1

Preparation of (QDA-1)HfMe$_2$

Toluene (80 mL) was added to 2-(8-anilino-5,6,7,8-tetrahydronaphthalen-1-yl)-N-(2,6-diisopropylphenyl)quinolin-8-amine (5.500 g, 10.46 mmol) and Hf(NMe$_2$)$_4$ (3.865 g, 10.89 mmol) to form a clear orange solution after stirring for a few minutes. The mixture was placed on a metal block that was then warmed to 85° C. After 21 hours the solution was clear and red tinted. The flask was allowed to cool to near ambient temperature and AlMe$_3$ (5.279 g, 73.23 mmol) was added quickly. The mixture became a darker red. After 7 hours the volatiles were removed overnight by evaporation with a stream of nitrogen. The resulting orange solid was crushed with a spatula and toluene (5 mL) was added to form a slurry. The slurry was stirred for 30 minutes then pentane (60 mL) was added. The suspension was stirred for 3 hours. The solid was then collected on a frit and washed with cold pentane (2×30 mL) to afford the product as an orange soil. $^1$H-NMR spectroscopic data indicated product (QDA-1)HfMe$_2$ of acceptable purity. Yield: 6.93 g, 90.5%.

Example 1. Polymerization of 1-Hexene

1-Hexene (40 mL) and hexane (200 mL) were loaded into a 500 mL round bottomed flask. The mixture was stirred rapidly. In a separate flask, toluene (20 mL) was added to (QDA-1)HfMe$_2$ (7.32 mg, 0.01 mmol) and N,N-dimethylanilinium tetrakis(perfluorophenyl)borate (8.01 mg, 0.01 mmol) to form a 0.5 mM solution of preactivated catalyst. A portion of the preactivated catalyst solution (4.0 mL, 0.002 mmol) was added to the round bottomed flask. After 30 minutes the mixture was very viscous. At this time a toluene (1 mL) solution of octadecyl 3-(3,5-di-tert-butyl-4-hydroxyphenyl)propionate (8 mg) was added to quench the catalyst and the mixture was poured into a Teflon-lined pan. The volatiles were evaporated under a stream of nitrogen at 70° C. to afford poly(1-hexene) as an orange-tinted rubbery solid. Yield: 3.71 g.

Example 2. Polymerization of 1-Octene

1-Octene (40 mL) and hexane (200 mL) were combined in a 500 mL round-bottomed flask. At ambient temperature a 1 mM toluene solution of N,N-dimethylanilinium tetrakis (perfluorophenyl)borate (3 mL, 0.003 mmol) was added followed by a 1 mM toluene of (QDA-1)HfMe$_2$ (3 mL, 0.003 mmol). The mixture was stirred rapidly. Within 5 minutes the mixture had thickened considerably. After 1 hour the mixture was very viscous, but still stirring. A toluene solution (2 mL) of octadecyl 3-(3,5-di-tert-butyl-4-hydroxyphenyl)propionate (20 mg) was added to quench the polymerization. The volatiles were evaporated at 60° C. under a stream of nitrogen. The product was isolated as a sticky pale yellow solid. Yield: 7.85 g.

Example 3. Polymerization of 1-Nonene

1-Nonene (12 mL) and hexane (50 mL) were loaded into a 250 mL round-bottomed flask. The mixture was stirred rapidly and a solution of bis(diisobutylaluminum)oxide solution in hexane (0.0217 mL, 0.020 mmol Al) was added. In a separate flask, toluene (20 mL) was added to (QDA-1) HfMe$_2$ (7.32 mg, 0.01 mmol) and N,N-dimethylanilinium tetrakis(perfluorophenyl)borate (8.01 mg, 0.01 mmol) to form a 0.5 mM solution of preactivated catalyst. A portion of the preactivated catalyst solution (6 mL, 0.003 mmol) was added. Within minutes the mixture began to thicken. After 30 minutes a toluene solution (1 mL) of octadecyl 3-(3,5-di-tert-butyl-4-hydroxyphenyl)propionate (10 mg) was added to the mixture. The thick solution was poured into stirring acetone. The resulting precipitate was triturated thoroughly and collected on a frit. The elastic solid was washed thoroughly with additional acetone (500 mL) and dried under a stream of nitrogen. The product is tacky and elastic. Yield: 5.6 g.

Example 4. Polymerization of 1-Decene

1-Decene (30 mL) and hexane (60 mL) were loaded into a 200 mL round-bottomed flask. The mixture was stirred rapidly. In a separate flask, toluene (20 mL) was added to (QDA-1)HfMe$_2$ (7.32 mg, 0.01 mmol) and N,N-dimethylanilinium tetrakis(perfluorophenyl)borate (8.01 mg, 0.01 mmol) to form a 0.5 mM solution of preactivated catalyst. A portion of the preactivated catalyst solution (5 mL, 0.0025 mmol) was added. After 10 minutes the mixture had become highly viscous, although the stirrer was still spinning at the bottom of the flask. After 30 minutes the polymerization was quenched by the addition of a toluene solution (1 mL) of octadecyl 3-(3,5-di-tert-butyl-4-hydroxyphenyl)propionate (10 mg). The thick solution was then poured into rapidly stirred acetone (800 mL). The resulting precipitate was isolated and then thoroughly kneaded in fresh acetone (200 mL) two times. The polymer was dried overnight under a stream of nitrogen. Yield: 5.7 g of a tacky rubbery solid.

Example 5. Polymerization of 1-Dodecene

1-Dodecene (30 mL) and hexane (60 mL) were loaded into a 200 mL round-bottomed flask. The mixture was stirred rapidly. In a separate flask, toluene (20 mL) was added to (QDA-1)HfMe$_2$ (7.32 mg, 0.01 mmol) and N,N-dimethylanilinium tetrakis(perfluorophenyl)borate (8.01 mg, 0.01 mmol) to form a 0.5 mM solution of preactivated catalyst. A portion of the preactivated catalyst solution (5 mL, 0.0025 mmol) was added. After 10 minutes the mixture had become highly viscous, although the stirrer was still spinning at the bottom of the flask. After 30 minutes the polymerization was quenched by the addition of a toluene solution (1 mL) of octadecyl 3-(3,5-di-tert-butyl-4-hydroxyphenyl)propionate (10 mg). The thick solution was then poured into rapidly stirred acetone (800 mL). The resulting precipitate was isolated and then thoroughly kneaded in fresh acetone (200 mL) two times. The polymer was dried overnight under a stream of nitrogen. Yield: 8.2 g of a tacky rubbery solid.

Example 6. Polymerization of 1-Tetradecene

1-Tetradecene (50 mL) and hexane (200 mL) were combined in a 500 mL round-bottomed flask. The mixture was stirred rapidly. In a separate flask, toluene (20 mL) was added to (QDA-1)HfMe$_2$ (7.32 mg, 0.01 mmol) and N,N- dimethylanilinium tetrakis(perfluorophenyl)borate (8.01 mg, 0.01 mmol) to form a 0.5 mM solution of preactivated catalyst. A portion of the preactivated catalyst solution (10 mL, 0.005 mmol) was added. The clear, pale yellow mixture thickened noticeably after 5 minutes. After 25 minutes the reaction was quenched by the addition of a toluene solution (1 mL) of octadecyl 3-(3,5-di-tert-butyl-4-hydroxyphenyl) propionate (10 mg). The flask was then fitted with a distillation head and most of the hexane (ca. 150 mL) was removed by distillation. The resulting very thick solution was poured into stirring acetone (1 L). The clear polymer jelly was kneaded in the acetone until it became white and was stirred overnight in a fresh batch of acetone (1 L). The resulting polymer was isolated from the acetone and squeezed to remove as much solvent as possible. The polymer was then dissolved in o-xylene (400 mL) to form a viscous solution. The hot solution was poured into acetone (1 L) and was rapidly stirred. The mixture was stirred overnight and the polymer was collected on a frit and washed with acetone (3×100 mL). The polymer was further dried in a vacuum oven at 90° C. overnight. Yield: 17.7 g.

Example 7. Polymerization of 1-Octadecene

1-Octadecene (20 mL) and hexane (40 mL) were combined in a round-bottomed flask. The mixture was stirred rapidly. In a separate flask, toluene (20 mL) was added to (QDA-1)HfMe$_2$ (7.32 mg, 0.01 mmol) and N,N-dimethylanilinium tetrakis(perfluorophenyl)borate (8.01 mg, 0.01 mmol) to form a 0.5 mM solution of preactivated catalyst. A portion of the preactivated catalyst solution (0.5 mL, 0.00025 mmol) was added. After 10 minutes the mixture had thickened significantly. Within 40 minutes the mixture was very thick. The mixture was allowed to stir for a total of 19 hours then was poured slowly into acetone with rapid stirring. The resulting polymer was thoroughly kneaded in the acetone (800 mL) to afford a stringy white solid that was collected on a frit and washed a second time with additional acetone (600 mL). Dried under reduced pressure. Yield: 2.54 g as a white stringy solid.

Crystallization and melting temperatures ($T_c$ and $T_m$, respectively) were characterized by differential scanning calorimetry using a DSC 2500 (TA Instruments) with heating/cooling rates of 10° C./min.

The master curve of the dynamic viscosity was obtained by performing dynamic frequency sweeps (DFS) over a frequency range of 0.01 Hz<omega<100 Hz, at temperatures ranging from 50° C. to 190° C. A strain-controlled rheometer ARES-G2 (TA Instruments) with parallel plates of diameter=8 mm was used for these measurements. The DFS data are shifted vertically and horizontally following the time-temperature superposition principle to construct master curves of the dynamic moduli (G' and G") with a reference temperature of 60° C. The dynamic viscosity is computed as:

viscosity=sqrt($G''2+G'''2$)/omega.

Extensional rheological measurements were performed on the poly(1-tetradecene) sample using a commercial Sentmanat extensional rheometer (SER, Xpansion Instruments) mounted on the ARES-G2 rheometer (TA Instruments). Specimens were prepared by molding the samples in to plaques with thickness ~0.65 mm, which were subsequently cut into rectangular shapes with dimensions 12.7×17 mm Before loading the samples, the temperature is equilibrated at 60° C. in the rheometer oven, where the SER is enclosed. After loading, the sample is allowed to relax for at least ten minutes before starting the test. Startup extensional experiments were carried out at four constants Hencky strain rates ranging from 0.01 s$^{-1}$ to 10 s$^{-1}$.

A Linkam tensile stage was used to measure the tensile properties of the poly(1-tetradecene) sample using a deformation rate of 0.1 mm/s. All the tensile tests, including Mullin tests, hysteresis, and permanent set were measured using a commercial TST350 Linkam tensile stage (Linkam Scientific). The dog bone specimens with dimensions 0.5 mm×3 mm×30 mm were cut and mounted in the TST350. The dog bone specimens were uniaxially deformed at room temperature with a speed of 100 microns/s and the strain and stress applied during deformation was recorded. The Mullins test consisted of sequential loading-unloading cycles with increasing maximum strain (20%, 50% 100%, 200%, 300%, 400%, and 500%). The hysteresis test consisted of sequential loading-unloading cycles with the same maximum strain (100%). The measurements were performed at room temperature. Multiple loading/unloading cycles were carried out with (1) increasing strains (Mullins test) and (2) constant strain (hysteresis tests). The Linkam tensile stage has a force transduce which records the tensile force during the deformation and allows the computation of the engineering stress. The permanent set values are the strains measured during the unloading steps when the stress reaches a value of zero.

Gel Permeation Chromatography (GPC) was carried out using an Agilent™ GPC PL-220 apparatus with RI and LS detectors to determine the number average molecular weight (Mn), and weight average molecular weight (Mw). The gel permeation column (PLgel 10 µm Mix-B) was calibrated with polystyrene and the mass was calibrated with NBS1475. For GPC measurements of the poly(alpha-olefin) samples the molecular weight modeling was analyzed as a new polymer via the "Universal Calibration" method, as described in Z. Grubisic, P. Rempp, and H. Benoit, *J. Poly. Sci. Part B: Poly. Let.* (1967), v. 5(9), pp. 753-759, which is incorporated herein by reference for the method. Accordingly, a polystyrene standard and an intrinsic viscosity detector were employed. The types of detectors used herein were DRI (for the determination of Mn) and MALLS (infrared, for the determination of Mw). The temperature of elution was 145° C. The solvent of elution was trichlorobenzene (TCB). The rate of elution was 0.5 ml/min. The determination of Mn was within ±100 g/mol, and Mw was ±500 g/mol.

$M_e$ was calculated from a rubbery plateau modulus, which is determined rheologically, as described in Lopez-Barron et al., (2018) *Macromolecules*, v. 51(17), pp. 6958-6966, which is incorporated herein by reference for the method.

The plateau modulus $G_N^0$ is the rubbery plateau modulus measured as the plateau in an elastic modulus, which was measured by dynamic frequency sweeps (DFS). DFS measurements were carried out in an ARES rheometer (TA Instrument) using a parallel plate geometry with a strain of 10% and frequency range of 0.01 Hz to 100 Hz. The entanglement molecular weight, $M_e$ was computed with the formula: $M_e=(rho\times R\times T)/G_N^0$, where rho is the density, R is the gas constant and T is the absolute temperature, as described in Lopez-Barron et al., (2018) *Macromolecules*, v. 51(17), pp. 6958-6966, which is incorporated herein by reference for the method.

The glass transition temperature (Tg) was computed as a middle temperature value at an inflexion point in the DSC trace under heating.

The complex viscosity was measured by Dynamic Frequency sweep (DFS) measurements. DFS measurements were carried out in an ARES rheometer (TA Instrument)

using parallel plate geometry with a strain of 10% and frequency range of 0.01 Hz to 100 Hz. The fundamental quantities obtained from the DFS test are the elastic moduli and viscous moduli (G' and G", respectively). The complex viscosity is computed as |eta*|=sqrt(G'^2+G"^2).

The extensional viscosity was measured at 60° C. using a commercial SER Sentmanat extensional rheometer (Xpansion Instruments LLC) mounted on an ARES rheometer (TA Instruments). The instrument generates data of extensional viscosity as a function of time during startup measurements.

As shown in Table 1, UHMW poly(alpha-olefin)s featuring a bottlebrush architecture were made via organometallic polymerization of 1-hexene, 1-octene, 1-nonene, 1-decene, 1-dodecene, 1-tetradecene, and 1-octadecene with (QDA-1) HfMe$_2$ in order to form Poly(1-hexene) (PH, Example 1), Poly(1-octene) (PO, Example 2), Poly(1-nonene) (PN, Example 3), Poly(1-decene) (PD, Example 4), Poly(1-dodecene) (PDD, Example 5), Poly(1-tetradecene) (PTD, Example 6), and Poly(1-octadecene) (POD, Example 7), respectively. These UHMW poly(alpha-olefin)s featuring a bottlebrush architecture showed crystallinity of the side chains, which has been fundamentally different to the chain folded lamellar observed in other polyolefins (e.g., polyethylene (PE) or polypropylene (PP)). Without being bound by theory, it is believed that side-chain crystallinity works as physical crosslinks that are connected by soft domains (tie chains) in these UHMW poly(alpha-olefin). Ultra-high molecular weights (>1M) were discovered to provide high stretchability of the UHMW poly(alpha-olefin) polymers, thus due to entanglements of the bottlebrush molecules. Isotactic poly(1-octadecene) bottlebrush polymers synthesized by organometallic polymerization of 1-octadecene (Example 7) demonstrated UHMW of 5,870,000 g/mol with an Mw/Mn value of 2.50 and a melting temperature of 54.1° C., at a density of 762 kg/m$^3$ and an entanglement molecular weight $M_e$ of 109 kg/mol with the lowest $G_N^0$ of 20.1 KPa. UHMW polymer was also obtained when 1-tetradecene (Example 6) was polymerized under the same conditions, with an Mw of 4,820,000 g/mol, a $M_e$ of 74.2 kg/mol and a density of 803 kg/m$^3$. Overall, it is observed that, with an increase of the number of carbon atoms (i.e., increase of Mw), entanglement molecular weight $M_e$ increases, while plateau modulus $G_N^0$ decreases. The decrease of the plateau modulus $G_N^0$ indicates an augmentation of viscoelastic network sensitivity to shear. Hence, the dynamic viscoelasticity of these UHMW poly(alpha-olefin) is dependent to their alkyl chain length.

TABLE 1

| Example | Poly (alpha-olefin) | $M_w \times 10^{-6}$ (g/mol) | $M_w/M_n$ | mm (%) | mr (%) | rr (%) | $^aT_g$ (° C.) | $^bT_m$ (° C.) |
|---|---|---|---|---|---|---|---|---|
| 1 | Poly(1-hexene), PH | 6.29 | 2.39 | 45.0 | 7.8 | 47.1 | −42.0 | ND |
| 2 | Poly(1-octene), PO | 3.03 | 2.41 | 80.8 | 5.5 | 13.6 | −63.5 | ND |
| 3 | Poly(1-nonene), PN | 1.65 | 1.76 | 85.7 | 8.8 | 5.5 | −67.6 | ND |
| 4 | Poly(1-decene), PD | 3.16 | 2.43 | 70.4 | 14.7 | 15.0 | −68.0 | −0.65 |
| 5 | Poly(1-dodecene), PDD | 3.96 | 2.48 | 69.9 | 13.8 | 16.3 | −66.5 | 25.9 |
| 6 | Poly(1-tetradecene), PTD | 4.82 | 2.12 | 39.0 | 9.7 | 51.3 | ND | 43.1 |
| 7 | Poly(1-octadecene), POD | 5.87 | 2.50 | 69.3 | 0.0 | 36.1 | ND | 54.1 |

| Example | Poly (alpha-olefin) | ρ (kg/m$^3$) | $C_1$ | $C_2$ | $T_0$ | $G_N^0$ (kPa) | $M_e$ (kg/mol) | Z |
|---|---|---|---|---|---|---|---|---|
| 1 | PH | 775 | 6.34 | 123 | 25 | 138 | 13.9 | 451 |
| 2 | PO | 792 | 4.91 | 136 | 25 | 72.5 | 27.1 | 112 |
| 3 | PN | 777 | 4.78 | 143 | 25 | 61.9 | 31.1 | 53.1 |
| 4 | PD | 784 | 4.81 | 153 | 25 | 51.1 | 38.0 | 83.1 |
| 5 | PDD | 801 | 4.51 | 161 | 25 | 35.9 | 55.3 | 71.7 |
| 6 | PTD | 803 | 3.99 | 181 | 50 | 28.2 | 74.2 | 65.0 |
| 7 | POD | 762 | 3.68 | 221 | 70 | 20.1 | 109 | 53.9 |

$^a$Measured as the G" peak in the DMTA plots.
$^b$Measured as the 2nd (high temperature) peak in the DSC traces.
ND: Not Detected Thermal and flow properties of a poly(1-tetradecene) with elastomeric properties were obtained. Poly(1-tetradecene) (PTD, Example 6) provided an Mw value of 4800 kDa and Mw/Mn value of 2.12. The thermal behavior of Example 6 sample is discussed below. Due to the slow crystallization, this Example 6 showed significant undercooling before it crystallized. However, PTD crystallized by annealing at 25° C. for more than 10 min PTD completely melted above 50° C. at which point it flowed relatively easily. FIG. 1 is a graph illustrating a DSC plot of poly(1-tetradecene). PTD was found to have elastomeric properties at room temperature. The first melt was recorded at 9.14° C. and the second melt at 42.91° C. Without being bound by theory, it is believed that the first melt corresponds to an order-order transition, which is related to change of conformation of the whole bottlebrush chains.

Figure 2:
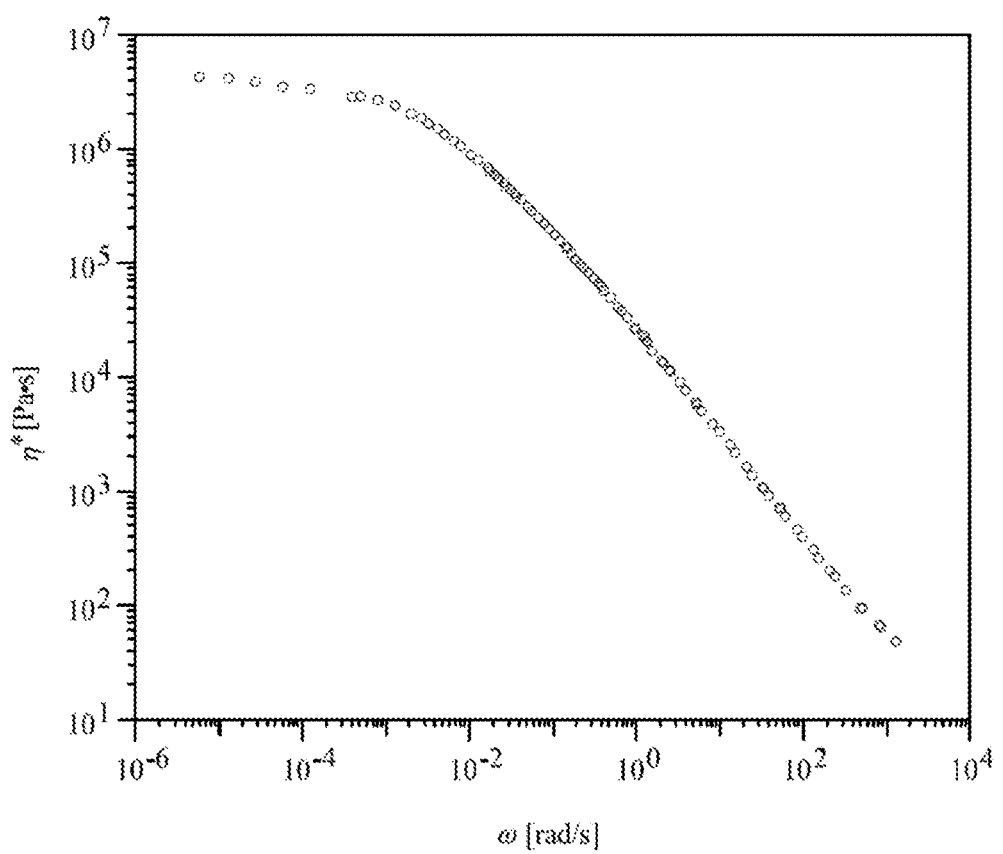
FIG. 2 is a graph illustrating complex viscosity (Pa·s) as a function of Angular Frequency of the Oscillatory Shear Rheological measurements of poly(1-tetradecene) measured by time-temperature superposition of dynamic frequency sweep data, according to one embodiment.

FIG. 2 is a graph illustrating the master curve of complex viscosity of poly(1-tetradecene) (Example 6) measured by time-temperature superposition of dynamic frequency sweep data measured in a temperature range from 50° C. to 190° C. The reference temperature is 60° C. FIG. 2 shows that the zero shear viscosity at 60° C. is very high (about 4×10$^6$ Pa·s), which indicates excellent melt strength. Additionally, PTD showed very strong shear thinning, which is excellent for processability in shear flow operations.

Figure 3A:
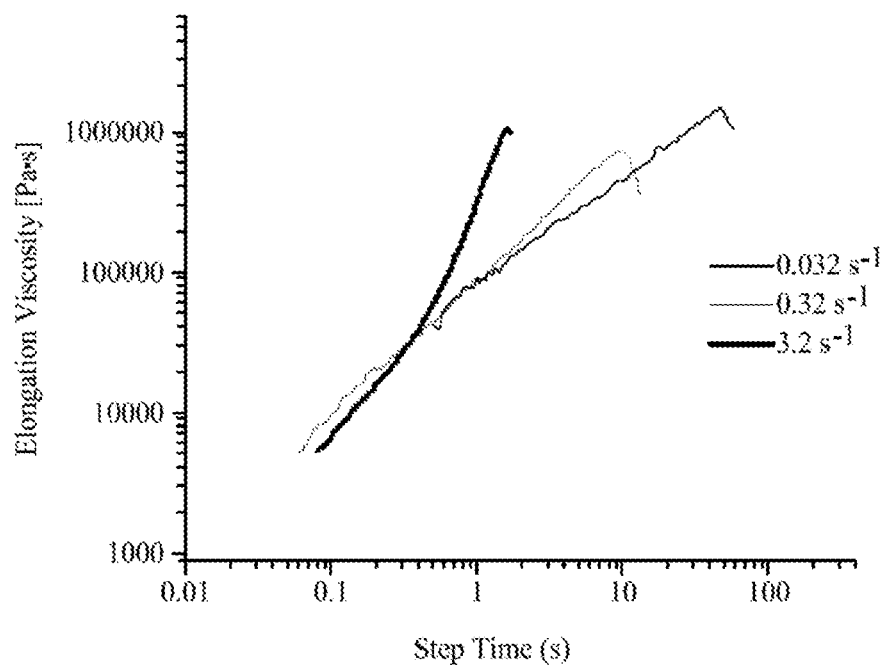
FIG. 3A and FIG. 3B are graphs illustrating a Transient Extensional Viscosity plots of poly(1-tetradecene) with an elongation viscosity (Pa·s) as a function of time (sec) measured at 60° C.
Figure 3B:
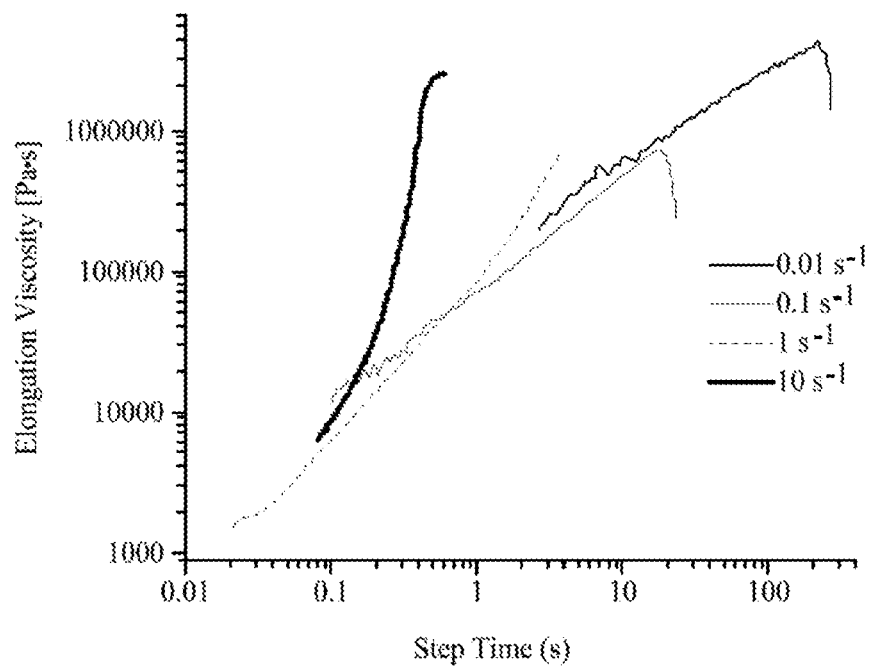

The extensional viscosity of the poly(1-tetradecene) is shown in FIG. 3A and FIG. 3B. The transient extensional viscosity of Poly(1-tetradecene) measured at 60° C. Strong strain-hardening was observed when PTD (Example 6) was stretched at rates >0.32 s$^{-1}$. Strain hardening response implied that good processability of the polymers in operations involving extensional flow (e.g., thermoforming, foaming, and blow molding) was obtained.

Figure 4A:
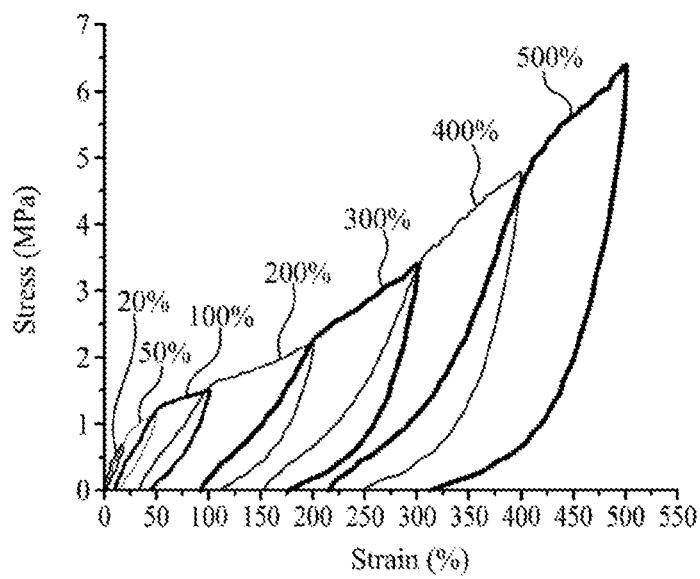
FIG. 4A is a graph illustrating Stress (MPa) as function of a strain (%) of poly(1-tetradecene), according to one embodiment.
Figure 4B:
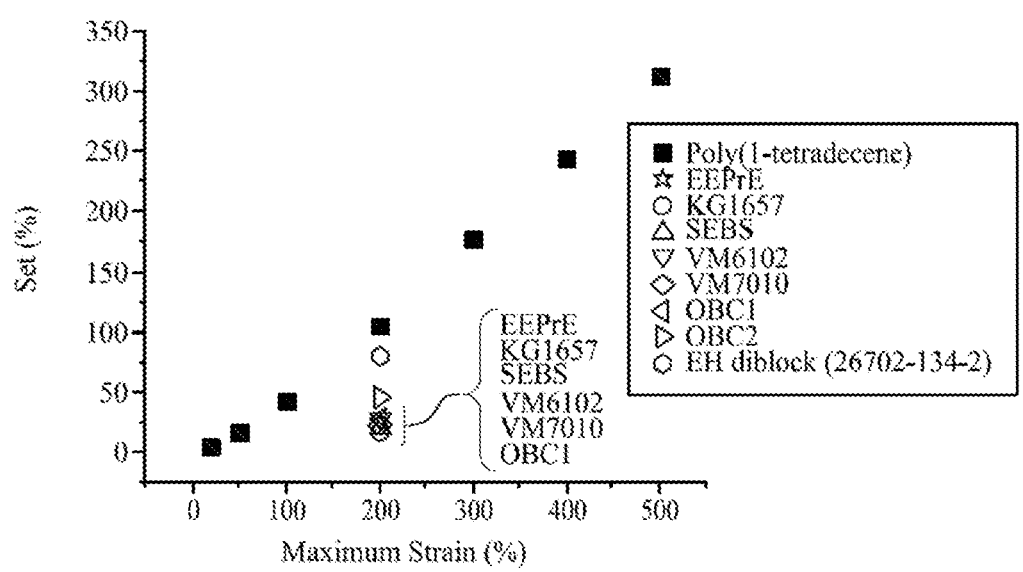
FIG. 4B is a graph illustrating a Permanent Set (%) as a function of maximum strain (%) of poly(1-tetradecene), according to one embodiment.

Tensile properties of poly(1-tetradecene) are depicted in FIG. 4 and measured at room temperature. Mullin test results (FIG. 4A) show the typical stress-strain behavior of a soft elastomer. The permanent set and hysteresis increased upon subsequent stretching cycles with increasing maximum strains. The permanent set values (%) as a function of the maximum strain (%) are shown in FIG. 4B and the description of the comparative materials is as follows:

EEPrE: Polyethylene-b-poly(ethylene propylene)-b-polyethylene EEPrE triblock copolymer via living anionic polymerization of 1,4-butadiene and isoprene followed by hydrogenation.

KG 1657: commercial Kraton™ G1657 grade SEBS with 13 wt % of styrene.

SEBS: SEBS with 29 wt % of styrene purchased from Sigma-Aldrich.

VM6102: EMCC Vistamaxx™ commercial propylene-based random copolymer with 16 wt % of ethylene.

VM7010: EMCC Vistamaxx™ commercial propylene-based random copolymer with 17 wt % of ethylene.

OBC1: Dow Infuse™ ethylene-based block copolymers with 28 wt % of octene.

OBC2: Dow Infuse™ ethylene-based block copolymers with 43 wt % of octene.

EH diblock: ethylene-based diblock copolymer synthesized in-house with 19 wt % of hexene.

FIG. 4B shows that the resulting permanent set of PTD was larger than that of the other commercial elastomers. At 200% strain, the permanent set of PTD was about 100, whereas the permanent set of the commercial elastomers cited above are about 75 or less.

Figure 4C:
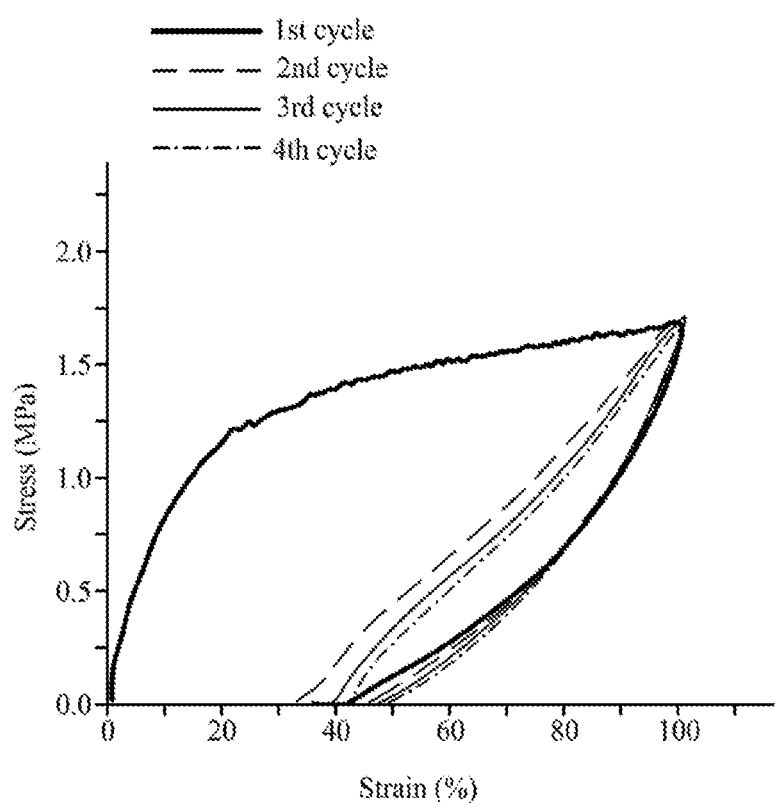
FIG. 4C is a graph illustrating Stress (MPa) as a function of strain (%) of poly(1-tetradecene), according to one embodiment.

Hysteresis tests with maximum strains of 100% and 300% are shown in FIG. 4C. No significant fatigue was observed after the second cycles with maximum strain of 100%. For cycles at strain of 300% noticeable fatigue starts to become evident after the second cycle. The strain to break of PTD has not been established because the value for the strain break of PTD was larger than the maximum strain achievable in the Linkam tensile stage TST350 used for the tensile tests reported herein. The strain to break of PTD was found to be greater than 500%, which is the strain limit for the Linkam tensile stage.

For impact modification of thermoplastic olefins (or TPOs), tension or compression set of a thermoplastic elastomer might not be critical, instead, its extensibility and softness may be more essential. Hence, these bottlebrush poly(1-tetradecene)s may be useful as TPO impact modifiers for their exceptional extensibility, softness, and processability (shear thinning and melt strength). In addition, these bottlebrush elastomers are surface active and can act as lubricating agents to lower the frictional coefficients of TPOs.

Overall, ultra-high molecular weight poly(alpha-olefins) featuring elastomeric properties due to side-chain crystallization may be obtained via organometallic polymerization of $C_{10}$-$C_{18}$ alpha-olefins using a group 4 non-metallocene catalyst, an activator, and a scavenger at either room temperature or higher temperature (e.g., 70° C.). The ultra-high molecular weight isotactic poly(alpha olefin)s can have rheological properties demonstrating high melt strength, strong shear thinning, and/or large stretchability.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A poly(alpha-olefin) comprising about 95 wt % or greater $C_{10}$-$C_{18}$ alpha-olefin content and having a weight average molecular weight of from about 1,000,000 g/mol to about 10,000,000 g/mol, wherein the poly(alpha-olefin) has an entanglement mass $M_e$ of from about 1 kg/mol to about 200 kg/mol, and wherein the poly(alpha-olefin) is a random copolymer.

2. The poly(alpha-olefin) of claim 1, wherein the poly(alpha-olefin) has a weight average molecular weight of from about 1,600,000 g/mol to about 6,500,000 g/mol.

3. The poly(alpha-olefin) of claim 1, wherein the poly(alpha-olefin) has a number average molecular weight of from about 400,000 g/mol to about 6,000,000 g/mol.

4. The poly(alpha-olefin) of claim 1, wherein the poly(alpha-olefin) is selected from a poly(1-decene), a poly(1-dodecene), a poly(1-tetradecene), or a poly(1-octadecene).

5. The poly(alpha-olefin) of claim 1, wherein the poly(alpha-olefin) has a comonomer content of greater than 0 wt % to about 5 wt %, and the comonomer is ethylene, propylene, or a mixture thereof.

6. The poly(alpha-olefin) of claim 1, wherein the poly(alpha-olefin) has a comonomer content of greater than 0 wt % to about 5 wt %, and the comonomer is a $C_{10}$-$C_{18}$ alpha-olefin, or a mixture thereof.

7. The poly(alpha-olefin) of claim 1, wherein the poly(alpha-olefin) has an Mw/Mn value of from about 1 to about 3.

8. The poly(alpha-olefin) of claim 7, wherein the poly(alpha-olefin) has an Mw/Mn value of from about 1.4 to about 2.6.

9. The poly(alpha-olefin) of claim 1, wherein the poly(alpha-olefin) has an entanglement mass $M_e$ of from about 10 kg/mol to about 125 kg/mol.

10. The poly(alpha-olefin) of claim 1, wherein the poly(alpha-olefin) has a first melt and a second melt according to differential scanning calorimetry.

11. The poly(alpha-olefin) of claim 1, wherein the poly(alpha-olefin) has a melting temperature (Tm) of from 0° C. to about 100° C.

12. The poly(alpha-olefin) of claim 11, wherein the poly(alpha-olefin) has a melting temperature (Tm) of from about −1° C. to about 60° C.

13. The poly(alpha-olefin) of claim 1, wherein the poly(alpha-olefin) has a glass transition temperature $T_g$ value of from about from about −70° C. to about −65° C.

14. The poly(alpha-olefin) of claim 1, wherein the poly(alpha-olefin) has a complex viscosity (measured at 60° C.) of from about 30 Pa·s to about 5,000,000 Pa·s and an extensional viscosity (measured at 60° C.) of from about 1,000 Pa·s to about 5,000,000 Pa·s.

15. The poly(alpha-olefin) of claim 1, wherein the poly(alpha-olefin) has a maximum stress value of from about 5 MPa to about 9 MPa at a 500% strain.

16. The poly(alpha-olefin) of claim 1, wherein the poly(alpha-olefin) has a tensile strength (measured at room temperature) of from about 1 MPa to about 3 MPa at the maximum stress (maximum strain of 100%).

17. The poly(alpha-olefin) of claim 1, wherein the poly(alpha-olefin) has at least 10% isotactic pentads.

18. The poly(alpha-olefin) of claim 17, wherein the poly(alpha-olefin) has at least 40% isotactic pentads.

19. A method for forming a poly(alpha-olefin), the method comprising:
introducing one or more $C_{10}$-$C_{18}$ alpha-olefins to a scavenger and a catalyst system comprising a catalyst compound and an activator; and
obtaining a poly(alpha-olefin) comprising about 95 wt % or greater $C_{10}$-$C_{18}$ alpha-olefin content and having a weight average molecular weight of from about 1,000,000 g/mol to about 10,000,000 g/mol, wherein the catalyst is:

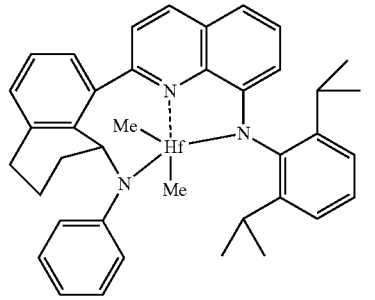

20. The method of claim 19, wherein the poly(alpha-olefin) has a number average molecular weight of from about 300,000 g/mol to about 1,000,000 g/mol.

21. The method of claim 19, wherein introducing is performed at a temperature of from about 20° C. to about 30° C.

22. The method of claim 19, wherein introducing is performed at a temperature of from about 50° C. to about 70° C.

23. The method of claim 19, wherein the poly(alpha-olefin) has an entanglement mass $M_e$ of from about 1 kg/mol to about 200 kg/mol.

24. The method of claim 19, wherein the poly(alpha-olefin) is a random copolymer.

25. The method of claim 19, wherein the poly(alpha-olefin) has a comonomer content of greater than 0 wt % to about 5 wt %, and the comonomer is ethylene, propylene, or a mixture thereof.

26. The method of claim 19, wherein the poly(alpha-olefin) has a comonomer content of greater than 0 wt % to about 5 wt %, and the comonomer is a $C_{10}$-$C_{18}$ alpha-olefin, or a mixture thereof.

* * * * *